(12) United States Patent
Powell

(10) Patent No.: US 10,852,955 B2
(45) Date of Patent: Dec. 1, 2020

(54) METHOD AND SYSTEM FOR ACCESSING DATA OBJECTS STORED IN A STORAGE SYSTEM USING OBJECT DESCRIPTORS ALLOCATED BY CLIENTS

(71) Applicant: EMC Corporation, Hopkinton, MA (US)

(72) Inventor: David Powell, Mountain View, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 740 days.

(21) Appl. No.: 14/983,203

(22) Filed: Dec. 29, 2015

(65) Prior Publication Data
US 2017/0185327 A1   Jun. 29, 2017

(51) Int. Cl.
*G05F 3/06* (2006.01)
*G06F 3/06* (2006.01)

(52) U.S. Cl.
CPC .......... *G06F 3/0619* (2013.01); *G06F 3/0665* (2013.01); *G06F 3/0689* (2013.01)

(58) Field of Classification Search
USPC .................................. 709/213–216, 227–229
See application file for complete search history.

(56) References Cited

U.S. PATENT DOCUMENTS

| | | | |
|---|---|---|---|
| 8,554,963 B1 | 10/2013 | Shapiro et al. | |
| 8,589,659 B1 | 11/2013 | Shapiro | |
| 9,003,090 B1 | 4/2015 | Davis | |
| 2003/0115439 A1* | 6/2003 | Mahalingam | G06F 16/182 712/1 |
| 2007/0250520 A1* | 10/2007 | Dettinger | G06F 16/958 |
| 2009/0112911 A1* | 4/2009 | Chu | G06F 16/137 |
| 2014/0258608 A1* | 9/2014 | Viswanatha | G06F 3/065 711/113 |
| 2015/0304422 A1* | 10/2015 | Shapiro | G06F 16/955 709/217 |
| 2016/0292193 A1* | 10/2016 | Madanapalli | G06F 21/6218 |

FOREIGN PATENT DOCUMENTS

| | | |
|---|---|---|
| CN | 1802614 | 7/2006 |
| CN | 101414188 | 4/2009 |

* cited by examiner

*Primary Examiner* — Younes Naji
*Assistant Examiner* — Da T Ton
(74) *Attorney, Agent, or Firm* — Womble Bond Dickinson (US) LLP

(57) ABSTRACT

A storage system includes a communication fabric, a storage module, a client device having an object descriptor (OD) generator to generate object descriptors (ODs) to access data stored in storage devices of the storage module. The storage system further includes a first control module (CM) coupled to the client device and the storage module via the communication fabric to manage accesses of the storage module. The first CM is adapted to receive a request from client device to access a data object stored in the storage module, where the request includes an OD uniquely identifying the data object and created by the OD generator of the client device. In response, the first CM examines a first object descriptor table (ODT) associated with the first CM to determine whether the OD is valid, and if the OD is valid allows the storage module to service the request.

21 Claims, 11 Drawing Sheets

METHOD AND SYSTEM FOR ACCESSING DATA OBJECTS STORED IN A STORAGE SYSTEM USING OBJECT DESCRIPTORS ALLOCATED BY CLIENTS

FIELD OF THE INVENTION

Embodiments of the present invention relate generally to data storage systems. More particularly, embodiments of the invention relate to accessing data objects using client-allocated object descriptors.

BACKGROUND

Typically, a file system has an architecture where a storage layer that performs the operations for storing and retrieving data uses file names and directory names on a storage backend. The file system can access data, which is a file or a directory, by using a file path to the data on the storage backend. When a file is created in a file system, some file systems generate a file handle for the file. A file handle is a file identifier that is independent of the file name and can be used to access the file. A client can retain the file handle and use the file handle for subsequent requests to access a file.

For example, a file system (FS) client communicates with an FS server regarding file access requests. The FS server in turn communicates with the storage subsystem in the file system regarding file access requests. Generally, at the storage level, the storage subsystem uses a file descriptor for the file to perform an operation (e.g., open file operation), rather than using a file handle. A file descriptor is an index for an entry in a kernel-resident data structure containing the details of the open files. In a portable operating system interface (POSIX) system, the data structure may be called a file descriptor table. Generally, the FS server does not have read/write access to the file descriptor table that includes the file descriptors for the open files. Typically, the file descriptors are assigned by the kernel of an operating system hosting the file system and the kernel records the assignment in the file descriptor table.

Traditionally, when the FS server receives a file handle from the FS client, the FS server has to request that the file be opened in order for the kernel to assign a file descriptor to the file. Conventionally, the FS server makes a system call to request the kernel to open the file. In response to the system call, the kernel would open the file, make the file descriptor assignment for the file, and return the file descriptor to the FS server. The FS server would then use the file descriptor, which was returned from the kernel, to issue a read call to the storage subsystem to perform a read operation on the file. When the read operation is complete, the FS server would issue a close call.

In a storage server that provides storage services to many clients and each client may access many files or objects, the kernel and/or FS server may have to handle operations of allocating and managing many file descriptors for many threads or processes. Within the kernel (or kernel analogue) directly servicing one or more clients or FS servers there may be multiple threads or entities responsible for managing or consuming file descriptor state. Synchronizing between those threads/entities is tedious and/or complicated, which can lead to lower performance.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
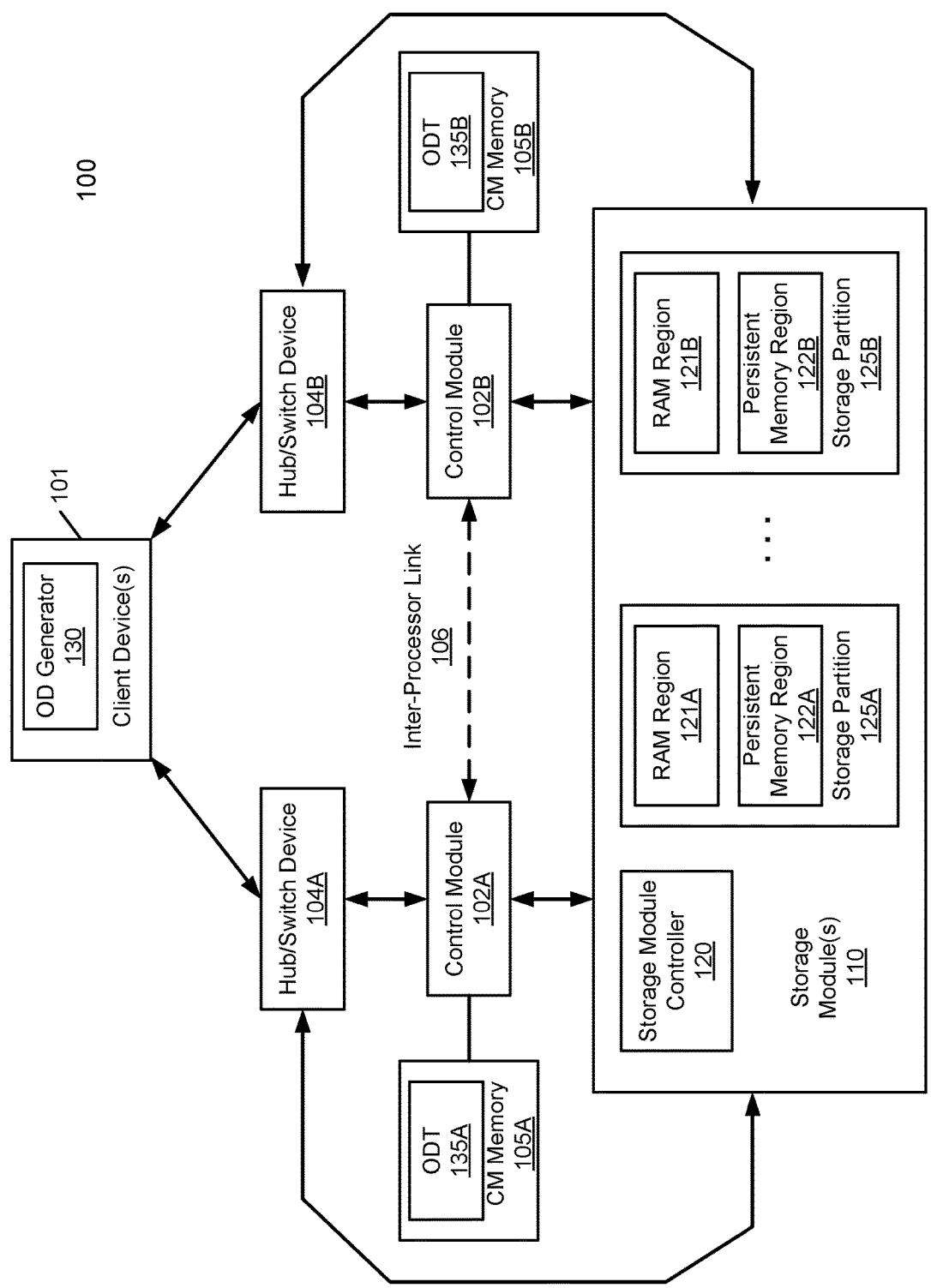
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, instead of a file system (FS) server component such as a kernel of an operating system (OS), a client component of the file system is responsible for generating or allocating an object descriptor or OD (also referred to as a file descriptor) of a file system object for the purpose of accessing the file system object. Specifically, when a file system client accesses an object hosted by the file system, the file system client initially allocates or generates a new object descriptor for that particular access session or process. The file system client makes a system call to the file system via a file system service application programming interface (API) to create or open the targeted object by passing the object descriptor and an object identifier (OID) of the target object (e.g., path/name). In response, a file system server component examines the object descriptor to determine whether the object descriptor is valid. If it is determined the object descriptor is valid, the file system server component updates an object descriptor table (ODT) associated with that particular access session or process. The ODT would include an ODT entry mapping the object descriptor to an object structure of the target object identified by the OID. When the access session or process is terminated, the file system server component can remove the corresponding object descriptor from the object descriptor table. In an object store environment, each object is uniquely identified by an object descriptor. In one embodiment, instead of a kernel of the object store or a server component of the object store, a client is responsible for allocating an object descriptor for accessing the corresponding object stored in the object store.

In a storage system having a redundant or fault tolerance capability, multiple control modules may be deployed to handle requests for accessing storage resources, such as data objects or files stored in one or more storage modules, from a variety of clients. Each of the control modules (e.g., operating as a storage controller) may maintain a copy of an object descriptor table for each of client processes or access sessions for accessing objects stored in the storage system. These control modules have to periodically synchronize their respective object descriptor tables in order to provide services to the clients, since a client can access the same object through any one of the control modules. By enabling or configuring a client to generate or allocate an object descriptor, the burden of the control modules for allocating object descriptors and synchronizing the object descriptors can be greatly reduced, as the control modules of the storage system may provide services to many clients concurrently.

According to one embodiment, a storage system includes a first control module (CM) and a second CM communicatively coupled to a client device and a storage module over a communication fabric, while the first CM and the second CM are coupled to each other over an inter-processor link (also referred to as a processor interconnect). One of the CMs may operate as a primary CM, while the other CM may operate as a secondary CM. The client device includes an OD generator or allocator to generate or allocate object descriptors. When the client device attempts to access an object (e.g., a file object), the client generates an object descriptor and sends a request with the object descriptor to a control module, in this example, a first CM. In response to the request, the first CM examines the object descriptor to determine whether the object descriptor is valid. The first CM may update its object descriptor table based on the object descriptor created by the client. If the object descriptor is valid, the first CM allows the client to access the targeted object. In addition, the first CM may transmit a control signal to a second CM over an inter-processor link to allow the second CM to synchronize its object descriptor table in view of the object descriptor.

FIG. 1 is a block diagram illustrating a storage system according to one embodiment of the invention. Storage system 100 may represent any storage server, such as, a cloud storage server, a content server, etc. Referring to FIG. 1, storage system 100 includes one or more client devices 101 (also simply referred to as clients) communicatively coupled to control modules 102A-102B and one or more storage modules 110 via one or more hub or switch devices 104A-104B. Although only one client 101 is shown, multiple clients can be applicable. Similarly, although only one storage module 110 is shown, multiple storage modules can also be applied and more CMs can be utilized in addition to CMs 102A-102B. Further, each of CMs 102A-102B may include a processor and a local memory such as CM memory devices 105A-105B (collectively referred to as CM memory devices 105). CM memory devices 105 may be any kinds of volatile memory devices, such as Dynamic Random-Access Memory (DRAM), Synchronous DRAM, SDR SDRAM, or DDR SDRAM.

In one embodiment, client 101 is coupled to CMs 102A-102B and storage module 110 via a communication fabric, while CM 102A and CM 102B are coupled to each other via an inter-processor link 106 (also referred to as a processor interconnect). In this example, for the illustration purpose, the communication fabric is represented by the solid lines or connections between the components 101-104B and 110, while inter-processor link 106 is represented by a dash line or dash connection. The communication fabric, represented by the solid lines and hub/switch devices 104A-104B in this example, may be a full mesh communication fabric that allows each of the components 101-104B and 110 to communicate with each other and to access resources (e.g., memory, processing resources) of each other.

In one embodiment, storage system 100 may be a server or a part of a cluster of servers to provide data storage or content services to remote devices over a network (e.g., the Internet). For example, client device 101 may be a frontend server component (e.g., Web server, content server, or cloud server) coupled to a backend storage appliance represented by CMs 102A-102B and storage module 110. In such a configuration, client 101 operates as a server to provide services to remote devices over the Internet, while client 101 operates as a client to the storage appliance represented by CMs 102A-102B and storage module 110 over a communication fabric. CMs 102A-102B, also collectively referred to as CMs 102, may operate as a storage controller or server component of the storage appliance.

In one embodiment, storage system 100 may be implemented within an electronic rack. For example, client 101 may be implemented as a part of client blade or plane inserted into a backplane representing a communication fabric (which is represented by the solid connections and hub/switch devices 104A-104B). CMs 102A-102B may be implemented as a part of a control blade or control plane inserted into the backplane. Storage module 110 may be implemented as a part of storage blade (or storage plane or data plane) inserted into the backplane. Thus, all of the blades are coupled to each other via the communication fabric using various appropriate communication protocols, while CMs 102A-102B are coupled to each other via inter-processor link 106 within the control blade. Other configurations may exist.

In one embodiment, storage module 110 includes one or more random access memory (RAM) devices and one or more persistent storage devices (not shown), which may be controlled or managed by a storage module controller 120. The RAM devices and the persistent storage devices of storage module 110 may be logically or physically partitioned into storage partitions 125A-125B (collectively referred to as storage partitions 125). Storage partitions 125A-125B may be allocated for CMs 102A-102B, respectively. Each of the storage partitions 125A-125B includes a corresponding RAM region such as RAM regions 121A-121B (collectively referred to RAM 121). RAM devices can be any types of volatile memory devices, such as, Dynamic Random-Access Memory (DRAM), Synchronous DRAM, SDR SDRAM, or DDR SDRAM. Similarly, each of storage partitions 125A-125B includes a corresponding persistent memory or storage region such as persistent memory regions 122A-122B (collectively referred to as persistent memory regions 122). Persistent storage regions 122 can be any of non-volatile storage devices, such as solid state memory devices (e.g., flash memory devices). CMs 102A-102B may communicate with storage module controller 120 over the communication fabric to access storage locations of storage partitions 125.

In one embodiment, storage module controller 120 is configured to receive requests to read from and/or write data to CMs 102A-102B. Further, storage module controller 120 is configured to service the read and write requests using storage partitions 125A-125B. In addition, storage module controller 120 may include a direct memory access (DMA) engine to move or copy data between storage partitions 125, CM memory devices 105, and a client memory of client 101 (not shown).

In one embodiment, the communication fabric can be any kinds of high speed communication fabrics, such as, for example, a PCTe, Ethernet, Fabre channel, or Infiniband™ fabric. Inter-processor link 106 may be an Intel QuickPath™ Interconnect or other point-to-point communication links. Inter-processor link 106 may be a dedicated private connection between CMs 102A-102B or alternatively, it may be implemented as part of the communication fabrics.

Client 101 may be any system that includes functionality to issue a read request to a storage appliance and/or issue a write request to the storage appliance. Client 101 may include a client processor and client memory (not shown). In one embodiment client 101 is configured to communicate with the storage appliance (represented by control modules 102A-102B and one or more of storage module 110) using a variety of communication protocols, such as, peripheral component interconnect (PCI), PCI-Express (PCIe), PCI-eXtended (PCI-X), non-volatile memory express (NVMe), non-volatile memory express (NVMe) over a PCIe fabric, non-volatile memory express (NVMe) over an Ethernet fabric, and non-volatile memory express (NVMe) over an InfiniBand fabric.

In one embodiment, the commands and responses/acknowledges exchanged amongst client 101, CMs 102A-102B, and storage module 110 may be exchanged via corresponding submission queues and completion queues maintained in various memories associated with these components. For example, Each of CM memories 105A-105B may contain individual or separate submission queues and completion queues for client 101 and storage module 110. Similarly, a client memory of client 101 may maintain a submission queue and a completion queue for each of CMs 102A-102B. A submission queue is used by an end point to submit a command to another end point over the communication fabric for a particular operation. A completion queue is used by an end point to place an acknowledgment or response to a command previously submitted via a submission queue.

For example, when client 101 initiates a read request to CM 102A, client 101 would place a read request command in submission queue associated with CM 102A maintained in memory 105A. By placing a command in the submission queue, CM 102A may be notified, for example, via an interrupt (e.g., doorbell interrupt). Similarly, when CM 102A completes a command issued from client 101, CM 102A would place an acknowledgment in a complete queue associated with client 101, which may be maintained in a client memory of client 101. Client 101 may then be notified, for example, via an interrupt, in response to the acknowledgment.

CM 102A may have read and write access rights or privileges to its storage partition 125A and has read-only access rights or privileges to storage partition 125B. Similarly, CM 102B may have read and write access rights to storage partition 125B and read-only access rights to storage partition 125A. Alternatively, both CMs 102A-102B may have read and write access rights to all memory regions and storage regions, as long as storage module controller 120 can manage or control the access contention and/or conflicts/coherency. In one embodiment, each of CMs 102A-102B can directly access any of storage partitions 125A-125B without involving storage module controller 120.

Typically, client 101 can access data stored in a storage region associated with CM 102A via a first communication path through CM 102A Likewise, client 101 can access data stored in a storage region associated with CM 102B via a second communication path through CM 102B. Both paths may be available for client 101 simultaneously for better bandwidth. Alternatively, one path may be a redundancy or protection path to the other path. When one path (e.g., path through CM 102B) is unavailable, client 101 can go through the other path (e.g., a path through CM 102A) to read or write data from or to a storage region associated with the failed path. Further information concerning client 101, CMs 102A-102B, and storage module 110, as well as the communication fabric, will be described in details further below with respect to FIGS. 6A-6D and 7-8.

Referring back to FIG. 1, as described above, client 101 may operate as a frontend server (e.g., Web server) to many remote devices (not shown) over a network (e.g., the Internet), while client 101 operates as a client to control modules 102A 102B. The remote devices may access storage resources of storage system 100 using a variety of protocols, such as network file system (NFS) protocols. When a remote device accesses a storage resource such as a file, the remote device sends a request (e.g., CREATE or OPEN request) to client 101 over a network. The request may be carried or embedded within one or more network packets using a variety of network protocols. Client 101 may generate a file handle and return the file handle to the remote device for subsequent accesses to the file. Client 101 in turn communicates with the underlying file system or object store of storage system 100, in this example, CMs 102A-102B using an object descriptor (also referred to as a file descriptor) representing a file system object associated with the file being accessed. That is, a remote device communicates with client 101 using a file handle or object handle, while client 101 communicates with CM 102A-102B using an object descriptor. For the purpose of illustration, throughout this application, the terms of "object descriptor" and "file descriptor" are interchangeable terms. Similarly, the terms of "object descriptor table" and "file descriptor table" are interchangeable terms. The terms of "object handle" and "file handle" are interchangeable terms.

Client 101 may maintain information mapping an object handle used by a remote device with an object descriptor used between client 101 and CMs 102 for a particular access session or access process. When client 101 accesses a particular object, client 101 has to create or open the targeted object, for example, with an object identifier (OID) that uniquely identifies the object. An object may also be accessed based on a combination of a storage path and name (path/name) of the object. In a conventional system, client 101 would make a system call via a file system API (e.g., CREATE, OPEN) by passing the object identifier of the target object as a parameter. In response, the file system or the kernel of the operating system, in this example, CMs 102, would generate or allocate an object descriptor and return the newly allocated object descriptor to client 101. Client 101 then utilizes the object descriptor for subsequent operations (e.g., READ, WRITE) with the target object.

According to one embodiment, client 101 includes an OD generator 130 (also referred to as an OD allocator) configured to generate or allocate object descriptors. When client 101 attempts (e.g., in response to a request received from a remote device) to access an object maintained by storage module 110, OD generator 130 of client 101 generates or allocates an object descriptor uniquely identifying the object being accessed within the current instance of access session or process. The attempt may write a new object to be stored in storage module 110 or alternatively, it may attempt to open an existing object for read and/or write operations. OD generator 130 may call a predetermined API to a library having a predetermined algorithm (not shown) to generate a unique object descriptor.

Client 101 then communicates with CM 102A as a primary CM in this example to open a new access session by passing the object descriptor as a parameter. For example, if client 101 wants to create a new object, client 101 may call a create function, such as CREATE (OD, OID). If client 101 wants to access an existing object, client 101 may call an open function, such as OPEN (OD, OID). In these examples, the OD is created or allocated by client 101, instead of CM 102A in a conventional system.

In response to the request (e.g., CREATE or OPEN), CM 102A examines the OD received from the system call to determine whether the OD is a valid OD in view of ODT 135A maintained in CM memory 105A by CM 102A. If it is determined that the OD is valid, CM 102A allows client 101 for subsequent actions to access the target object (e.g., READ, WRITE), where client 101 uses the OD as a reference for that particular session. CM 102A updates ODT 135A maintained in CM memory 105A that is associated with CM 102A. ODT 135A is utilized by CM 102A to authenticate and/or authorized client 101 for accessing objects stored in storage module 110. Similarly, ODT 135B is utilized by CM 102B to authenticate and/or authorized client 101 for accessing storage module 110.

In addition, CM 102A communicates with CM 102B over inter-processor link 106 to allow CM 102B to synchronize ODT 135B maintained in CM memory 105B with ODT 135A associated with CM 102A. As a result, since CMs 102A-102B do not have to generate or allocate ODs and they provide services to many clients, such a configuration significantly reduce the potential coherency, race condition, and/or ODT synchronization issues, if CMs 102A-102B were to allocate the ODs.

In one embodiment, CM 102A may transmit information of the new ODT entry to CM 102B via inter-processor link 106. Alternatively, CM 102A may utilize the shared storage module 110 to convey the information of the new ODT entry to CM 102B. For example, CM 102A may store, for example, via storage module controller 120, the ODT entry and/or the entire ODT in a predetermined storage location of storage module 110. The predetermined storage location is a storage location previously agreed upon between CMs 102A-102B. In response, CM 102B can retrieve the ODT entry and/or ODT information from the predetermined storage location and update its ODT 135B. For example, CM 102A may store the ODT entry information in a predetermined storage location of RAM region 121A and sends a notification to CM 102B via inter-processor link 106. The notification may include information indicating where the ODT entry information is stored or located. In response to the notification, CM 102B retrieves the information from RAM region 121A and copies the information to RAM region 121B and then to ODT 135B of CM memory 105B.

Note that system 100 has been described in view of multiple CMs 102A-102B. It will be appreciated that the benefit of the techniques described throughout this application can also be applicable to a system having a single CM. Even without the second CM, there is a benefit here in that there are multiple or many threads running within one CM that would normally require more and/or explicit synchronization were the CM to implement the OD allocation. By moving the OD allocation to the client, the need for this synchronization is almost entirely eliminated. In other words, there are multiple or many threads on each CM with whom the allocation of an OD can be implicitly published to, without a need for synchronization or error checking beyond what is performed by the initial receiving thread.

Figure 2:
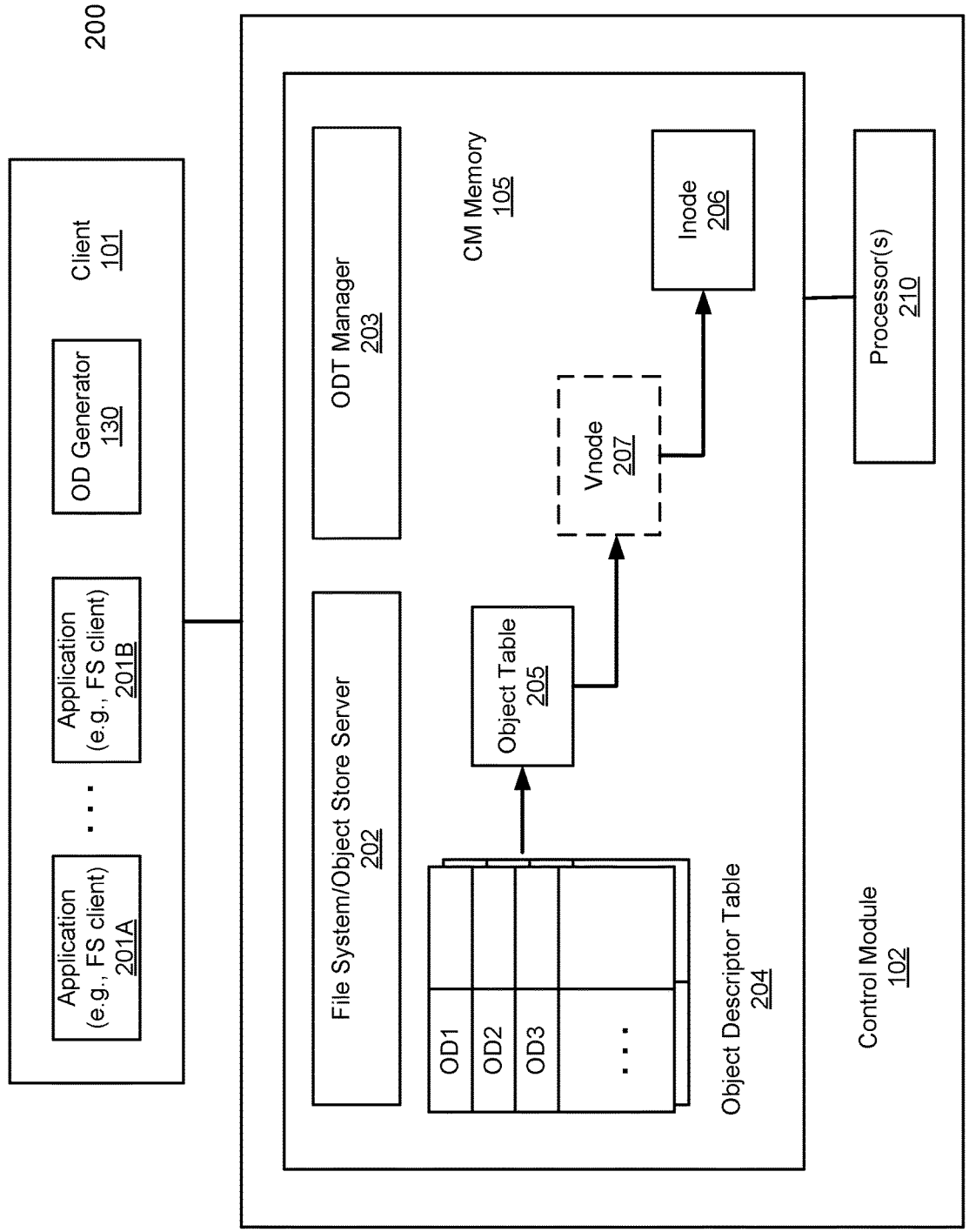
FIG. 2 is a block diagram illustrating a storage system according to another embodiment of the invention.

FIG. 2 is a block diagram illustrating a storage system according to another embodiment of the invention. Storage system 200 may represent storage system 100 of FIG. 1. Referring to FIG. 2, storage system 200 includes, but is not limited to, client 101 communicatively coupled to control module 102 associated with one or more storage modules (e.g., storage module 110 of FIG. 1) over a communication fabric as described above. Although only one client is shown, multiple clients can be coupled to the control module 102 to access storage resources maintained in the storage modules. Similarly, although only one control module is shown, multiple control modules may be deployed. For example, control module 102 may represent any of control modules 102A-102B of FIG. 1.

As described above, client 101 may include its own processor and memory to host client applications 201A-201B and OD generator 130. Client applications 201A-201B may be any kinds of software applications, such as, for example, backup software, or Web server software to provide services to remote devices. According to one embodiment, when application 201A attempts to read or write an object in the storage module managed by control module 102 (e.g., in response to a request received from a remote device), application 201A invokes OD generator 130 to generate a new object descriptor for this particular read or write session or process associated with application 201A.

Application 201A may call a predetermined API to invoke OD generator, where the API may be provided by a library. OD generator 130 may be running within a kernel of an operating system associated with client 101. For example, OD generator 130 may be integrated with or communicatively coupled to a file system or kernel running within an operating system of client 101, where the file system or the kernel is configured to generate object descriptors. OD generator 130 is capable of generating a unique OD that identifies that particular access session of application 201A running or executed as a process.

Once application 201A obtains a new object descriptor, application 201A sends a request for accessing the object via a system call, such as an NFS call, to control module 102 using the new object descriptor. The request may be received by file system or object store server component 202, which may be part of a file system or object store service interface. For example, if application 201A attempts to write a new object, it may make a system call to create the new object, such as, for example, CREATE (OD, OID). If application 201A attempts to read an existing object, it may make a system call to open the existing object, such as, for example, OPEN (OD, OID). An OID can be formed based on a path/name of the corresponding object. Note that throughout this application the names of the system APIs and the associated calling convention are described for the purpose of illustration only. Other names or identifiers and calling conventions may also be utilized.

In these examples, the OD is generated at client 101 by OD generator 130 and the OD is passed from client 101 as a parameter to file system server component 202. In response to the system call (e.g., CREATE or OPEN), file system server 202 invokes OD manager 203 to determine whether the OD passed from client 101 is valid. If it is determined the OD is valid, OD manager 203 updates an ODT associated with application 201A, in this example ODT 204, and allows the requested action(s) to be performed. In addition, according to one embodiment, OD manager 203 may communicate with another CM (e.g., redundant CM) over an inter-processor link to synchronize the updates of its ODT. If it is determined that the OD is invalid, file system server 202 denies the request.

Note that ODT 204 is a per process ODT, in which each of processes that currently have an open session with CM 102 is associated with an ODT. Another word, ODT 204 may represent multiple ODTs, one for each of the processes currently having an open session with the file system hosted by CM 102. In this example, ODTs 204 includes a first ODT for a first process associated with application 201A and a second ODT for a second process associated with application 201B. Each ODT includes an ODT entry corresponding to an object currently opened by the corresponding process. An object descriptor is an index or identifier for an entry in an ODT. An ODT entry includes the OD passed from client 101 for the object being accessed, which maps the OD to an entry of an object table associated with the object being accessed, in this example, object table 205. An object can be a file, a directory of one or more files, or other storage resources.

Object table 205 may be a system-wide table of objects opened by all processes, which contains one or more entries, each entry corresponding to one of the opened objects. An entry of object table 205 may be created when the corresponding object is created or opened the first time. The entry of object table 205 may be identified based on the object's OID such as a path/name provided by the client. The entry of object table 205 records the mode with which the object (or other resources) has been opened, such as read, write, or read-write. The entry of object table 205 includes a pointer pointing to an inode 206 of the physical object. Inode 206 includes information or metadata describing the actual object. For example, inode 206 includes the date the object was created, the object size and a storage location of the object in a storage device, as well as other metadata of the object (e.g., last modified time, attributes). The information in inode regarding the storage location of the object is used to locate the object so that a process can perform an action on the object (e.g., read, write, copy, delete).

If the file system is a virtual file system, object table 205 may point to a virtual node (vnode) 207 representing an open virtual node of the virtual file system. Virtual node 207 in turn points to inode 206. There may be multiple ones of vnode 207 referencing inode 206. A virtual file system is an abstraction layer on top of a physical file system. The virtual file system provides an interface or contract between the kernel and the physical file system. A virtual node is an abstraction representing an open object in the virtual file system.

In one embodiment, in response to a CREATE or OPEN call, ODT manager 203 examines an ODT associated with application 201A, in this example for the purpose of illustration, ODT 204, to determine whether ODT 204 contains an ODT entry that matches the OD passed from application 201A. If ODT 204 already contains an ODT entry matching the OD, it means the object has already existed or has been opened, and thus the OD is invalid. If ODT 204 does not contain a matching ODT entry, in one embodiment, ODT manager 203 creates a new ODT entry in ODT 204 to store the OD passed from application 201A and maps the OD to a corresponding object table as described above. Thereafter, a success status is returned back to application 201A indicating that the system call has been successfully serviced.

In addition, according to one embodiment, once the new ODT entry has been created, ODT manager 203 is configured to communicate with other CMs in the system via an inter-processor link to allow other CMs to synchronize their ODTs in view of the new ODT entry. Referring back to FIG. 1, it is assumed CM 102A receives a CREATE or OPEN call from client 101, CM 102A creates a new ODT entry in ODT 135A, an ODT manager of CM 102A will transmit a signal to an OD manager of CM 102B to allow CM 102B to update its ODT 135B to include the new ODT entry. As a result, client 101 can access the same object through CM 102B. Client 101 may be authenticated and authorized by CM 102B based on its ODT 135B.

Referring back to FIG. 2, once ODT 204 has been updated and synchronized with other CMs, application 201A of client 101 can use the OD to access the object, for example, via READ or WRITE calls. When application 201A terminates the access session, it may make a CLOSE call. In response to the CLOSE call, OD manager performs a lookup in ODT 204 associated with application 201A to locate an ODT entry matching the OD and to remove the ODT entry from ODT 204. In addition, OD manager 203 communicates with other CMs via an inter-processor link to allow other CMs to synchronize their respective ODTs by removing the corresponding ODT entry. In this example, it is the responsibility of OD generator 130 of client 101 to deallocate the OD. Note that components 202-207 may be implemented in software, hardware, or a combination thereof. In this embodiment, components 202-207 may be hosted in CM memory 105 and executed by one or more processors 210.

Figure 3:
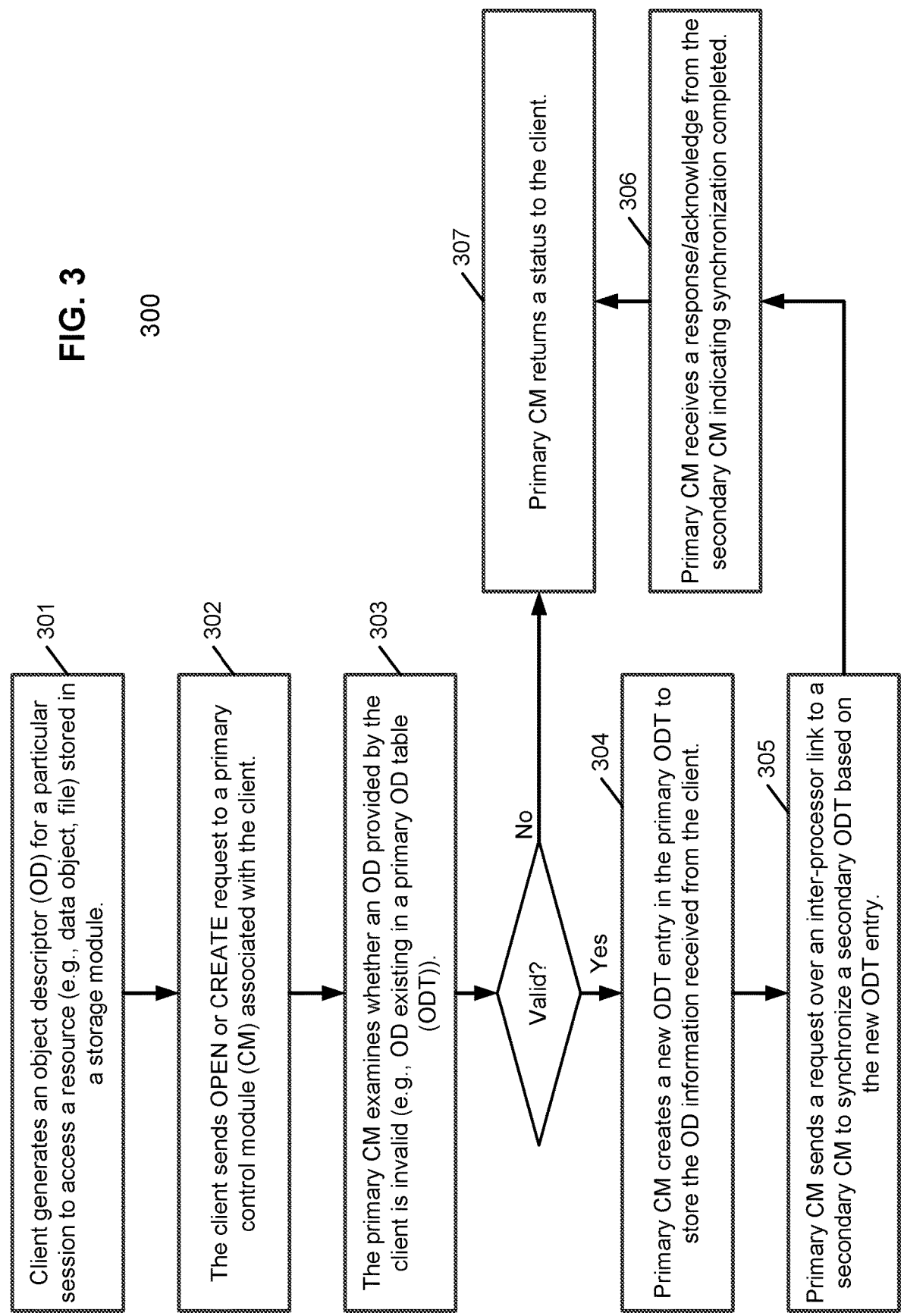
FIG. 3 is a flow diagram illustrating a process of creating or opening an object using an object descriptor allocated by a client according to one embodiment of the invention.

FIG. 3 is a flow diagram illustrating a process of creating or opening an object using an object descriptor allocated by a client according to one embodiment of the invention. Process 300 may be performed by processing logic that includes hardware (e.g. circuitry, dedicated logic, etc.), software (e.g., embodied on a non-transitory computer readable medium), or a combination thereof. For example, process 300 may be performed by any of the storage systems as shown in FIGS. 1-2. Referring to FIG. 3, at block 301, a client generates or allocates an object descriptor for a particular session to access a particular storage resource (e.g., an object) stored in a storage system. At block 302, the client communicates with a primary CM (e.g., a first CM operating as a storage controller) via a set of predetermined APIs, such as CREATE or OPEN, by passing the object descriptor as a parameter. At block 303, the primary CM determines whether an OD provided by the client is valid. In one embodiment, the primary CM examines its ODT (e.g., a primary ODT) to determine whether the ODT contains an ODT entry that matches the OD provided by the client. If it is determined that there is an existing ODT entry in the ODT, it means that the object has already been created or opened by another process and thus, the OD is invalid. In response to determining that the OD is invalid, at block 307, the primary CM denies the request by returning a failure status to the client.

If it is determined, at block 303, there is no ODT entry matching the OD and thus the OD is valid, at block 304, the primary CM creates a new ODT entry in its ODT to store the OD passed from the client, as well as an object identifier identifying the object to be accessed (e.g., a path/name of the object). The ODT entry maps the OD to an object structure or table associated with the object. At block 305, the primary CM optionally sends a request to a secondary CM (e.g., a second CM operates as a redundant or protection CM) to synchronize the new ODT entry in a secondary ODT associated with the secondary CM. At block 306, the primary CM receives an acknowledgment from the secondary CM indicating that the ODTs have been synchronized. In response to the acknowledgment, at block 307, the primary CM returns a status (e.g., success status) to the client.

Figure 4:
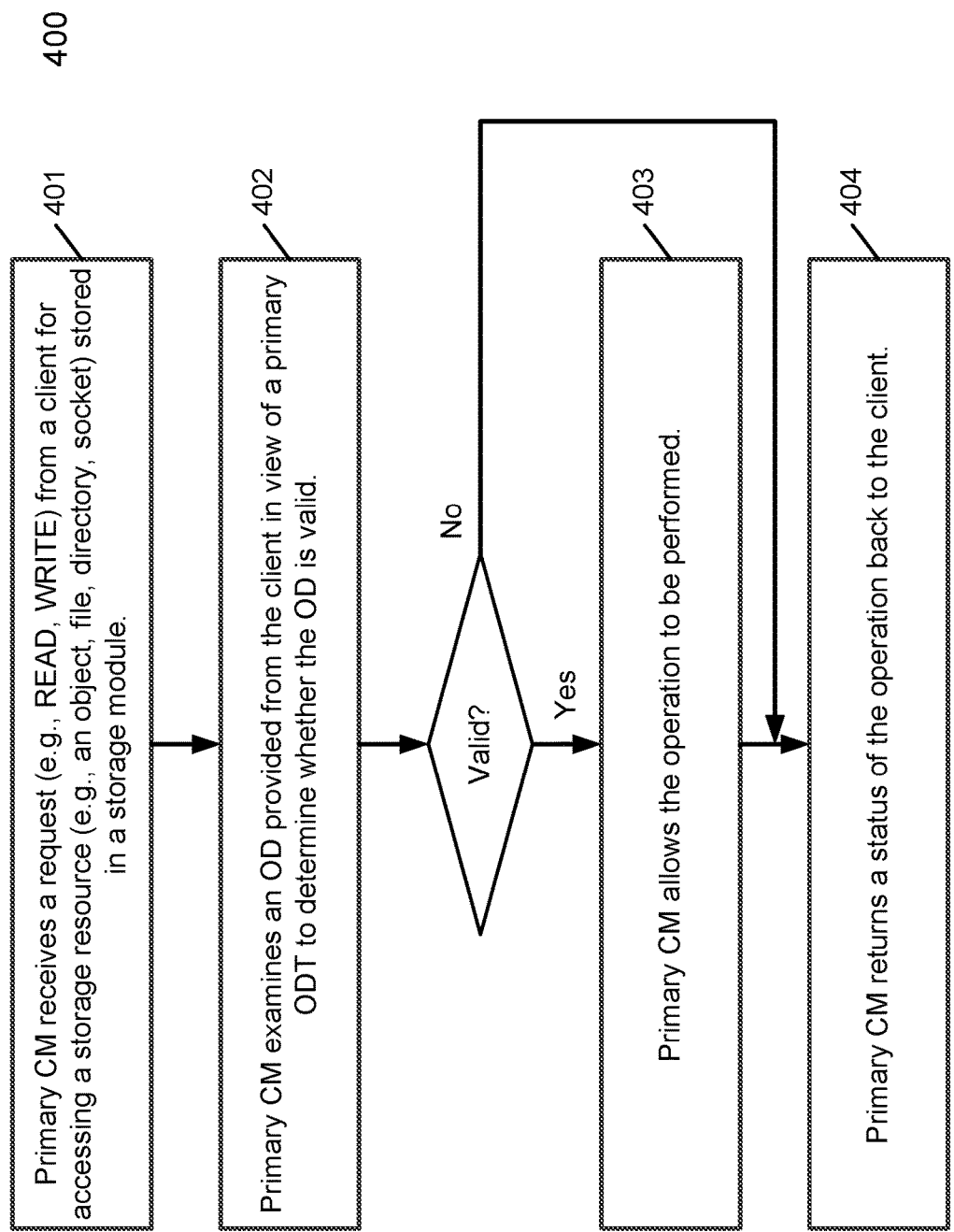
FIG. 4 is a flow diagram illustrating a process of accessing an object using an object descriptor allocated by a client according to one embodiment of the invention.

FIG. 4 is a flow diagram illustrating a process of accessing an object using an object descriptor allocated by a client according to one embodiment of the invention. Process 400 may be performed by processing logic that includes hardware (e.g. circuitry, dedicated logic, etc.), software (e.g., embodied on a non-transitory computer readable medium), or a combination thereof. For example, process 400 may be performed by any of the storage systems as shown in FIGS. 1-2. Referring to FIG. 4, at block 401, a primary CM receives a request from a client for accessing an object (e.g., READ, WRITE), where the request includes an OD provided from the client. The OD was created or allocated by the client when the client created or opened the object. At block 402, the primary CM examines its ODT to determine whether the OD is valid. In one embodiment, the primary CM examines the ODT contains an ODT entry that matches the OD received from the client. If it is determined that the OD is valid, at block 403, the primary CM allows the operations to be performed associated with the request. At block 404, the primary CM returns a status to the client based on the operations. If it is determined at block 402 that the OD is invalid, the primary CM denies the request by returning a failure status to the client at block 404.

Figure 5:
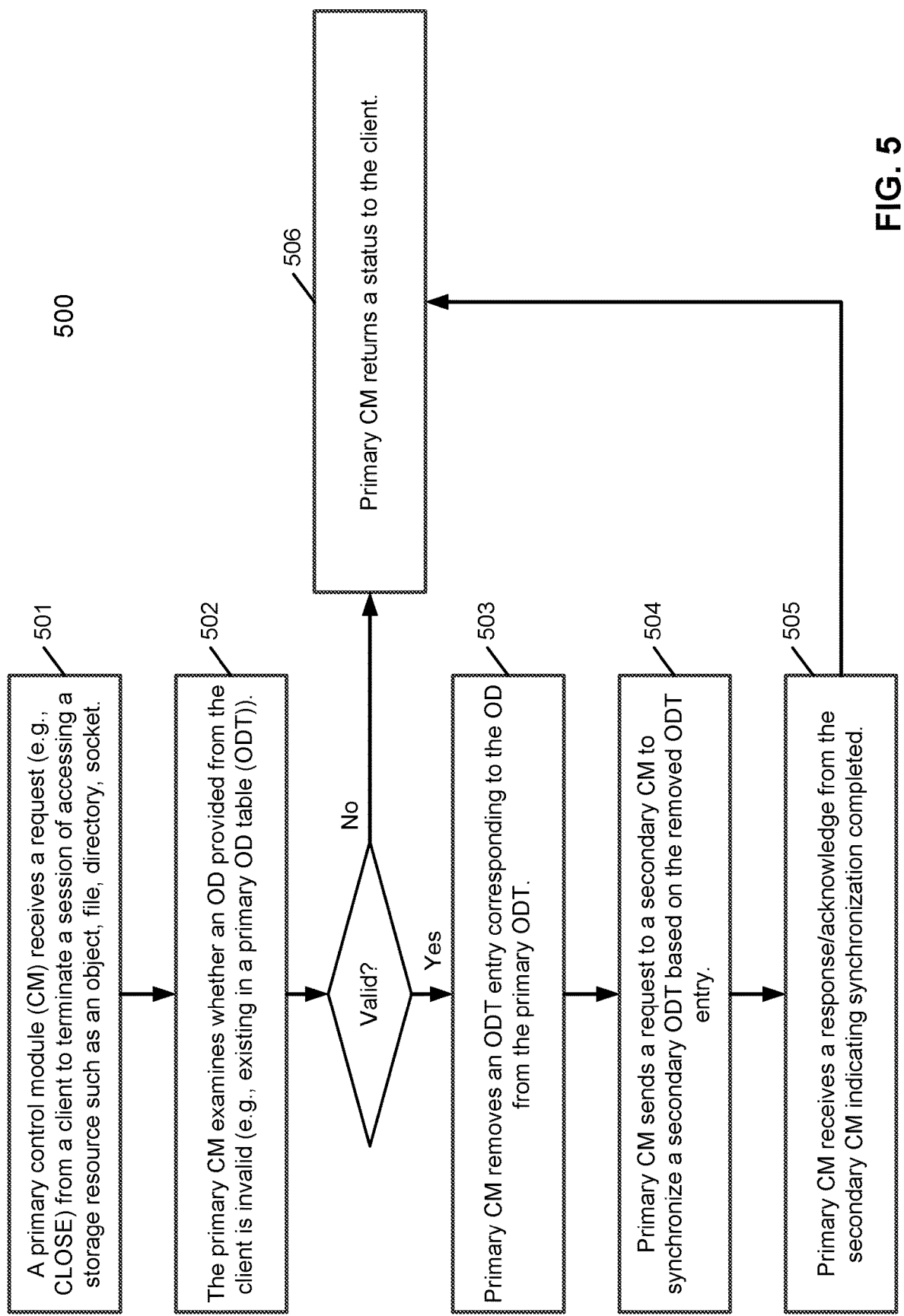
FIG. 5 is a flow diagram illustrating a process of terminating a session of accessing an object using an object descriptor allocated by a client according to one embodiment of the invention.

FIG. 5 is a flow diagram illustrating a process of terminating a session of accessing an object using an object descriptor allocated by a client according to one embodiment of the invention. Process 500 may be performed by processing logic that includes hardware (e.g. circuitry, dedicated logic, etc.), software (e.g., embodied on a non-transitory computer readable medium), or a combination thereof. For example, process 500 may be performed by any of the storage systems as shown in FIGS. 1-2. Referring to FIG. 5, at block 501, a primary CM receives a request from a client for terminating a session of accessing an object, where the request includes an OD that was created or allocated by the client. In response to the request, at block 502, the primary CM examines a primary ODT to determine whether the OD is valid. In particularly, the primary CM examines the primary ODT to determine whether the primary ODT contains an ODT entry that matches the OD. If it is determined that the OD is valid, at block 503, the primary CM removes the matching ODT entry from the primary ODT. At block 504, the primary CM optionally sends a request to a secondary CM, for example, over an inter-processor link, to request the secondary CM to synchronize its ODT by removing the corresponding ODT entry. At block 505, the primary CM receives an acknowledgment from the secondary CM indicating that the synchronization has been performed. In response to the acknowledgment, at block 506, the primary CM returns a success status to the client. On the other hand, if it is determined at block 502 that the OD is invalid (e.g., no matching ODT entry), the primary CM denies the request at block 506.

Figure 6A:
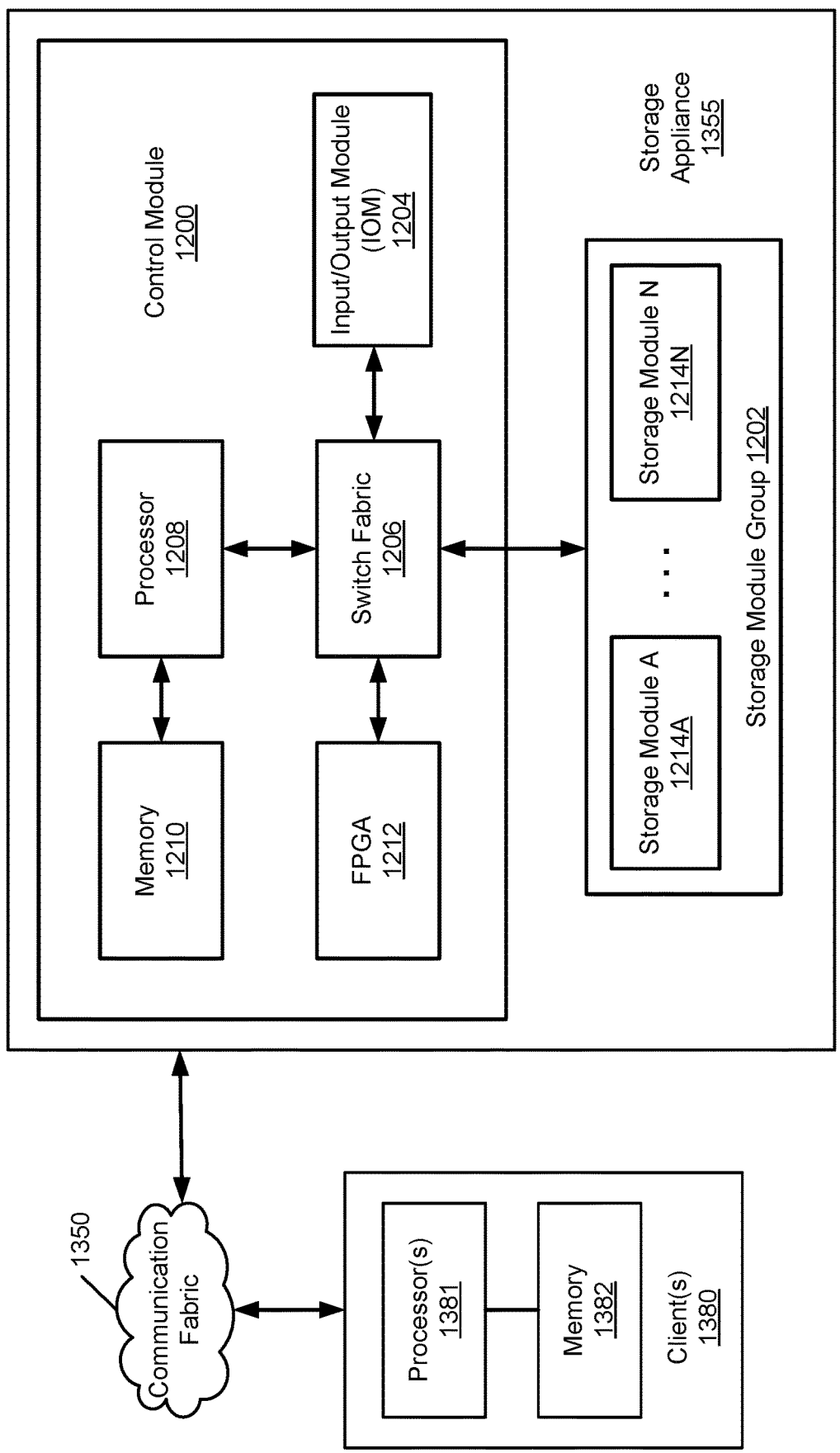
FIGS. 6A-6D are block diagrams illustrating examples of a storage appliance according to certain embodiments of the invention.

FIGS. 6A-6D are block diagrams illustrating examples of a storage appliance according to certain embodiments of the invention. The storage appliance may represent a storage appliance described above. Referring to FIG. 6A, the storage appliance includes a control module 1200 and a storage module group 1202. Control module 1200 may represent any of the control modules described above. In one embodiment, control module 1200 is configured to manage the servicing of read and write requests from one or more clients or client devices 1380. A client herein may represent any of the clients or client devices described above. In one embodiment, control module 1200 is configured to receive requests from one or more clients 1380 via a communication fabric 1350, to process the requests (which may include sending the requests to a storage module), and to provide a response to client 1380 after the request has been serviced.

In one embodiment, control module 1200 includes an Input/Output Module (TOM) 1204, a switch fabric 1206, a processor 1208, a memory 1210, and, optionally, a Field Programmable Gate Array (FPGA) 1212. In one embodiment, TOM 1204 is the physical interface between the clients and the other components in the storage appliance. The TOM 1204 supports a variety of communication protocols, such as, for example, PCI, PCIe, PCI-X, Ethernet (including, but not limited to, the various standards defined under the IEEE 802.3a-802.3bj), Infiniband, and Remote Direct Memory Access (RDMA) over Converged Ethernet (RoCE).

In one embodiment, switch fabric 1206 includes one or more interconnected switches. If switch fabric 1206 includes multiple switches, each switch may be connected to every other switch, may be connected to a subset of switches in the switch fabric, or may only be connected to one other switch in the switch fabric. In one embodiment, each of the switches in switch fabric 1206 is a combination of hardware and logic (implemented, for example, using integrated circuits) (as defined by the protocol(s) the switch fabric implements) that is configured to connect various components together in the storage appliance and to route packets (using the logic) between the various connected components. In one embodiment, switch fabric 1206 is physically connected to TOM 1204, processor 1208, storage module group 1202, and, if present, FPGA 1212. In one embodiment, all inter-component communication in control module 1200 (except between the processor 1208 and memory 1210) passes through switch fabric 1206. Further, all communication between control module 1200 and storage module group 1202 passes through the switch fabric 1206. In one embodiment, switch fabric 1206 is implemented using a PCI protocol (e.g., PCI, PCIe, PCI-X, or another PCI protocol). In such embodiments, all communication that passes through switch fabric 1206 uses the corresponding PCI protocol.

In one embodiment, if switch fabric 1206 implements a PCI protocol, switch fabric 1206 includes a port for the processor (or, more specifically, a port for the root complex integrated in processor 1208 or for the root complex connected to the processor), one or more ports for storage modules 1214A to 1214N in storage module group 1202, a port for the FPGA 1212 (if present), and a port for IOM 1204. Each of storage modules 1214A01214N may represent any of the storage modules described above. In one embodiment, each of the aforementioned ports may be configured as a transparent bridge or a non-transparent bridge. Those skilled in the art will appreciate that while switch fabric 1206 has been described with respect to a PCI implementation, switch fabric 1206 may be implemented using other protocols without departing from embodiments of the invention.

In one embodiment, at least one switch in switch fabric 1206 is configured to implement multicasting. More specifically, in one embodiment, processor 1208 is configured to generate a multicast group where the multicast group includes two or more members with each member specifying an address in memory 1210 and/or in storage modules 1214A-1214N. When the multicast group is created, the multicast group is associated with a multicast address. In order to implement the multicasting, at least one switch in the switch fabric is configured that when a write specifying the multicast address as the destination address is received, the switch is configured to generate a new write for each member in the multicast group and issue the writes to the appropriate address in the storage appliance. In one embodiment, the address for each write generated by the switch is determined by adding a particular offset to the multicast address.

Processor 1208 may be a group of electronic circuits with a single core or multiple cores that are configured to execute instructions. In one embodiment, processor 1208 may be implemented using a Complex Instruction Set (CISC) Architecture or a Reduced Instruction Set (RISC) Architecture. In one embodiment, processor 1208 includes a root complex (as defined by the PCIe protocol). In one embodiment, if control module 1200 includes a root complex (which may be integrated into processor 1208) then memory 1210 is coupled to processor 1208 via the root complex. Alternatively, memory 1210 is directly connected to processor 1208 using a point-to-point connection mechanism. In one embodiment, memory 1210 may be any volatile memory including, but not limited to, Dynamic Random-Access Memory (DRAM), Synchronous DRAM, SDR SDRAM, and DDR SDRAM.

In one embodiment, processor 1208 is configured to create and update an in-memory data structure (not shown), where the in-memory data structure is stored in memory 1210. In one embodiment, the in-memory data structure includes mappings (direct or indirect) between logical addresses and physical storage addresses in the set of storage modules. In one embodiment, the logical address is an address at which the data appears to reside from the perspective of the client. In one embodiment, the logical address is (or includes) a hash value generated by applying a hash function (e.g. SHA-1, MD-5, etc.) to an n-tuple. In one embodiment, the n-tuple is <object ID, offset ID>, where the object ID defines a file and the offset ID defines a location relative to the starting address of the file. In another embodiment of the technology, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the technology, the logical address includes an object ID and an offset ID. Those skilled in the art will appreciate that multiple logical addresses may be mapped to a single physical address and that the logical address is not limited to the above embodiments.

In one embodiment, the physical address may correspond to (i) a location in memory 1210, (ii) a location in the vaulted memory, or (iii) a location in a solid state memory module. In one embodiment, the in-memory data structure may map a single hash value to multiple physical addresses if there are multiple copies of the data in the storage appliance.

In one embodiment, memory 1210 includes one or more of the following: a submission queue for processor 1208, a completion queue for processor 1208, a submission queue for each of the storage modules 1214A-1214N in the storage appliance, and a completion queue for each of storage modules 1214A-1214N in the storage appliance. In one embodiment, the submission queue for processor 1208 is used to send commands (e.g., read request, write request) to processor 1208. In one embodiment, the completion queue for processor 1208 is used to signal processor 1208 that a command it issued to another entity has been completed. The submission and completion queues for the storage modules function in a similar manner.

In one embodiment, processor 1208 (via the switch fabric) is configured to offload various types of processing to FPGA 1212. In one embodiment, FPGA 1212 includes functionality to calculate checksums for data that is being written to the storage module(s) and/or data that is being read from the storage module(s). Further, FPGA 1212 may include functionality to calculate P and/or Q parity information for purposes of storing data in the storage module(s) using a RAID scheme (e.g., RAID 2-RAID 6) and/or functionality to perform various calculations necessary to recover corrupted data stored using a RAID scheme (e.g., RAID 2-RAID 6). In one embodiment, storage module group 1202 includes one or more storage modules (1214A-1214N) each configured to store data.

In one embodiment, processor 1208 is configured to program one or more DMA engines in the system. For example, processor 1208 is configured to program the DMA engine in the client switch. Processor 1208 may also be configured to program the DMA engine in the storage module. In one embodiment, programming a DMA engine in the client switch may include creating a multicast group and generating descriptors for each of the members in the multicast group.

In one embodiment, communication fabric 1350 can be any of high speed communication fabrics, such as, for example, a PCTe, Ethernet, Fabre channel, or Infiniband™ fabric. Client 1380 may be any system that includes functionality to issue a read request to a storage appliance and/or issue a write request to the storage appliance. Client 1380 may include a client processor 1381 and client memory 1382. In one embodiment client 1380 is configured to communicate with storage appliance 1355 using a variety of communication protocols, such as, Peripheral Component Interconnect (PCI), PCI-Express (PCIe), PCI-eXtended (PCI-X), Non-Volatile Memory Express (NVMe), Non-Volatile Memory Express (NVMe) over a PCI-Express fabric, Non-Volatile Memory Express (NVMe) over an Ethernet fabric, and Non-Volatile Memory Express (NVMe) over an Infiniband fabric.

In one embodiment, if client 1380 implements PCI, PCI-express, or NVMe, client 1380 may include a root complex (not shown). A root complex is a device that connects client 1380 (including its client processor and client memory) to the PCIe Fabric. In one embodiment, the PCIe Fabric includes root complexes and endpoints which are connected via switches. An endpoint is a device other than a root complex or a switch that can originate PCI transactions (e.g., read request, write request) or that is a target of PCI transactions. One or more clients and one or more storage appliances may be integrated as part of a PCIe fabric. Further, if the individual components within the storage appliance communicate using PCIe and individual components in client 1380 communicate using PCIe, then all the components in the storage appliance and client 1380 may be considered part of a single PCIe Fabric.

The client memory 1382 may include a submission queue (SQ) for the client processor and a completion queue (CQ) for the client processor. In one embodiment of the invention, the storage appliance memory, such as memory devices 1210 include one or more submission queues for client processors visible to a client through the communication fabric. The client memory 1382 includes one or more completion queues for the client processor visible to the storage appliance through the communication fabric. The submission queue for the client processor is used to send commands (e.g., read request, write request) to the client processor. The completion queue for the client processor is used to signal the client processor that a command it issued to another entity has been completed.

Client 1380 may further include a client switch to couple client 1380 to the communication fabric, where the client switch may include one or more switch devices. If the client switch includes multiple switches, each switch may be connected to every other switch, may be connected to a subset of the switches in the switch fabric, or may only be connected to one other switch. In one embodiment of the invention, each of the switches in the client switch is a combination of hardware and logic configured to permit data and messages to be transferred between the client 1380 and the storage appliances 1355.

In such embodiments, a client switch may include one or more ports, where each port may be configured as a transparent bridge or a non-transparent bridge. Ports implemented as transparent bridges allow the root complex to continue discovery of devices (which may be other root complexes, switches, PCI bridges, or endpoints) connected (directly or indirectly) to the port. In contrast, when a root complex encounters a port implemented as a non-transparent bridge, the root complex is not able to continue discovery of devices connected to the port—rather, the root complex treats such a port as an endpoint.

When a port is implemented as a non-transparent bridge, devices on either side of the non-transparent bridge may only communicate using a mailbox system and doorbell interrupts (implemented by the client switch). The doorbell interrupts allow a processor on one side of the non-transparent bridge to issue an interrupt to a processor on the other side of the non-transparent bridge. Further, the mailbox system includes one or more registers that are readable and writeable by processors on either side of the switch fabric. The aforementioned registers enable processors on either side of the client switch to pass control and status information across the non-transparent bridge.

In in order to send a PCI transaction from a device on one side of the non-transparent bridge to a device on the other side of the non-transparent bridge, the PCI transaction must be addressed to the port implementing the non-transparent bridge. Upon receipt of the PCI transaction, the client switch performs an address translation (either using a direct address translation mechanism or a look-up table based translation mechanism). The resulting address is then used to route the packet towards the appropriate device on the other side of the non-transparent bridge.

The client switch is configured such that at least a portion of the client memory is directly accessible to the storage appliance. That is, a storage appliance on one side of the client switch may directly access, via the client switch, client memory on the other side of the client switch. The client switch may include a DMA engine programmed by either the client processor or a storage appliance connected to the client switch. The DMA engine may be programmed to read data from an address in the portion of the client memory that is accessible to the storage appliance and directly write a copy of such data to memory in the storage appliance or storage modules. Further, the DMA engine may be programmed to read data from the storage appliance and directly write a copy of such data to an address in the portion of the client memory that is accessible to the storage appliance.

In one embodiment of the invention, the DMA engine supports multicasting. In such embodiments, a processor in the storage appliance may create a multicast group, where each member of the multicast group corresponds to a unique destination address in memory on the storage appliance. Each member of the multicast group is associated with a descriptor that specifies: (i) the destination address; (ii) the source address; (iii) the transfer size field; and (iv) a control field. The source address for each of the descriptors remains constant while the destination address changes for each descriptor. Once the multicast group is created, any data transfer through the switch targeting the multicast group address, including a transfer initiated by a DMA engine, places an identical copy of the data in all of the destination ports associated with the multicast group. The switch processes all of the multicast group descriptors in parallel.

Figure 6B:
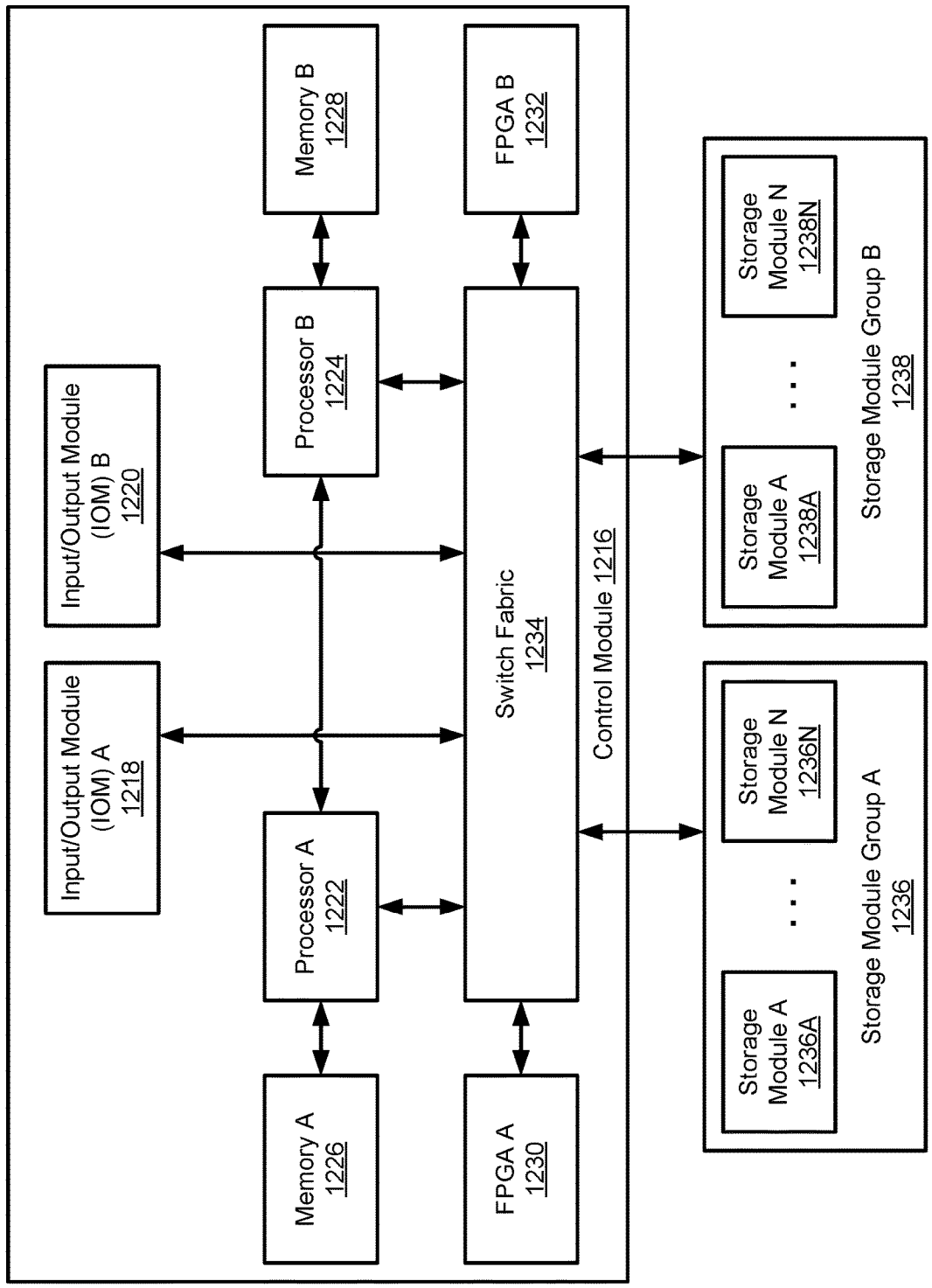

Referring now to FIG. 6B, according to another embodiment, a storage appliance includes a control module 1216 and at least two storage module groups 1236 and 1238. Control module 1216 includes a switch fabric 1234, which is directly connected to TOM A 1218, TOM B 1220, processor A 1222, processor B 1224, (if present) FPGA A 1230, (if present) FPGA B 1232, storage modules 1236A-1236N in storage module group A 1236 and storage modules 1238A-1238N in storage module group B 1238. All communication between the aforementioned components (except between processor A 1222 and processor B 1224) passes through switch fabric 1234. In one embodiment of the technology, processors 1222 and 1224 within control module 1216 are able to directly communicate using, for example, point-to-point interconnect such as Intel® QuickPath Interconnect.

In one embodiment, the two IOMs 1218 and 1220 in control module 1216 double the I/O bandwidth for control module 1216 (over the I/O bandwidth of a control module with a single IOM). Moreover, the addition of a second IOM (or additional IOMs) increases the number of clients that may be connected to a given control module and, by extension, the number of clients that can be connected to a storage appliance. In one embodiment, the use of switch fabric 1234 to handle communication between the various connected components (described above) allows each of processors 1222 and 1224 to directly access (via the switch fabric 1234) all FPGAs 1230 and 1232 and all storage modules (1236A-1236N, 1238A-1238N connected to switch fabric 1234.

Figure 6C:
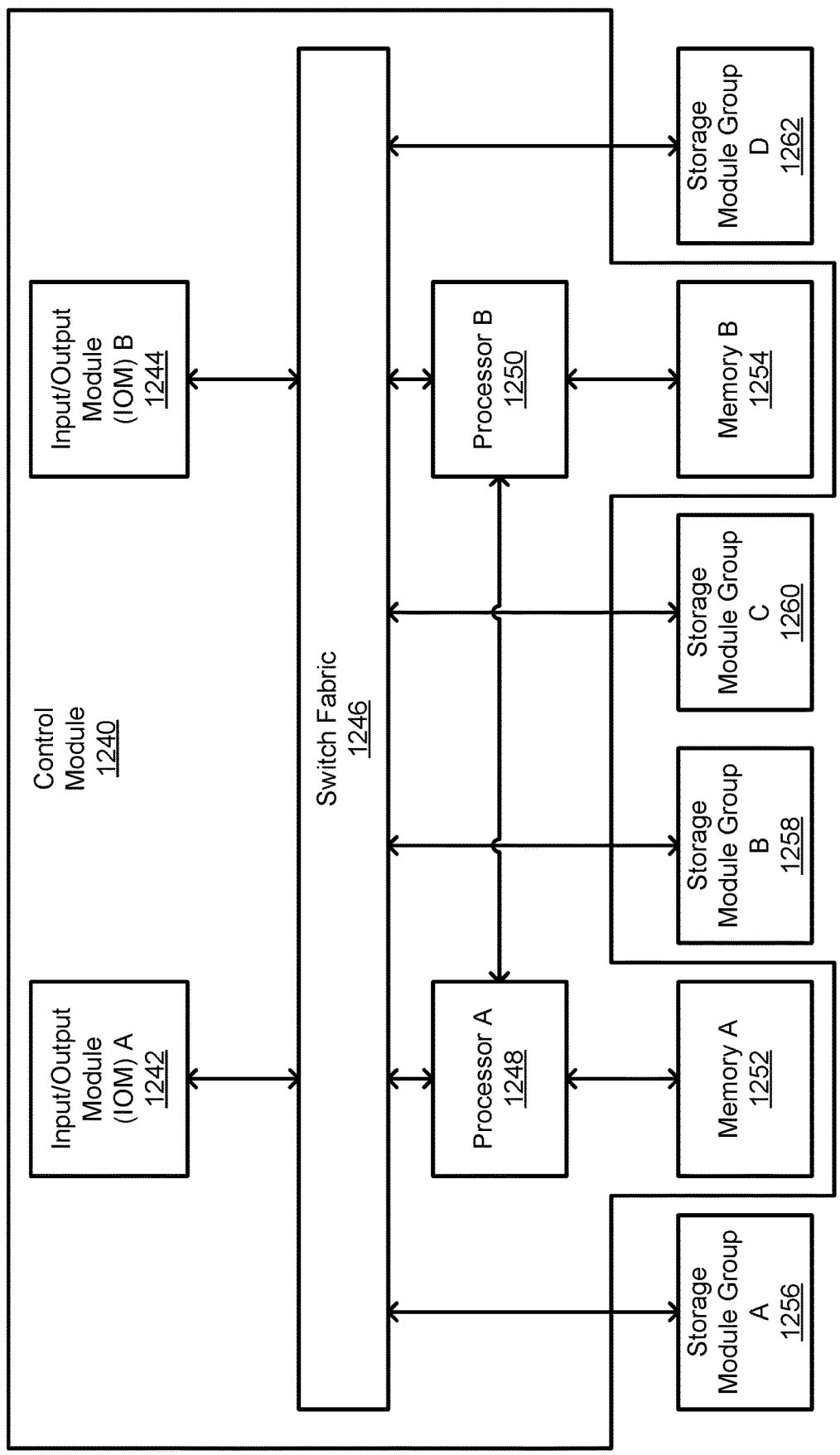

Referring to FIG. 6C, according to another embodiment, a storage appliance includes a control module 1240 connected (via a switch fabric 1246) to multiple storage modules (not shown) in the storage module groups (1256, 1258, 1260, 1262). Control module 1240 includes two IOMs (1242, 1244), two processors (1248, 1250), and memory (1252, 1254). In one embodiment, all components in control module 1240 communicate via switch fabric 1246. The operations of these components are similar to the operations described above.

In one embodiment, processor A 1248 is configured to primarily handle requests related to the storage and retrieval of data from storage module groups A and B (1256, 1258) while processor B 1250 is configured to primarily handle requests related to the storage and retrieval of data from storage module groups C and D (1260, 1262). However, the processors (1248, 1250) are configured to communicate (via the switch fabric 1246) with all of the storage module groups (1256, 1258, 1260, 1262). This configuration enables control module 1240 to spread the processing of I/O requests between the processors and/or provides built-in redundancy to handle the scenario in which one of the processors fails.

Figure 6D:
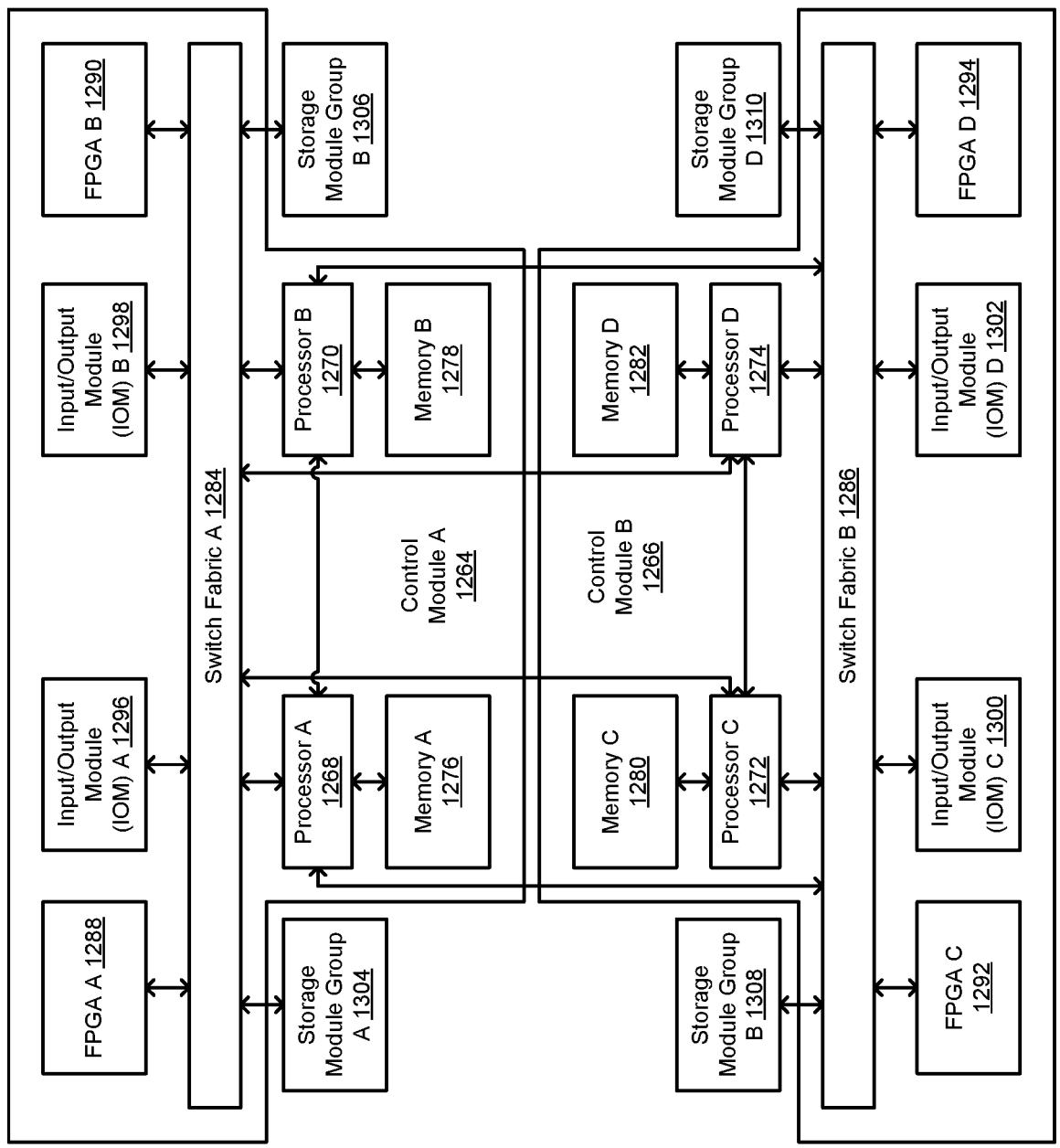

Referring to FIG. 6D, according to another embodiment, a storage appliance includes two control modules (1264, 1266). Each control module includes IOMs (1296, 1298, 1300, 1302), processors (1268, 1270, 1272, 1274), memory (1276, 1278, 1280, 1282), and FPGAs (if present) (1288, 1290, 1292, 1294). Each of the control modules (1264, 1266) includes a switch fabric (1284, 1286) through which components within the control modules communicate.

In one embodiment, processors (1268, 1270, 1272, 1274) within a control module may directly communicate with each other using, for example, a point-to-point interconnect such as Intel® QuickPath Interconnect. In addition, processors (1268, 1270) in control module A may communicate with components in control module B via a direct connection to the switch fabric (1286) in control module B. Similarly, processors (1272, 1274) in control module B may communicate with components in control module A via a direct connection to the switch fabric (1284) in control module A.

In one embodiment, each of the control modules is connected to various storage modules (denoted by storage module groups (1304, 1306, 1308, 1310)). Each control module may communicate with storage modules connected to the switch fabric in the control module. Further, processors in control module A (1264) may communicate with storage modules connected to control module B (266) using switch fabric B (1286). Similarly, processors in control module B (1266) may communicate with storage modules connected to control module A (1264) using switch fabric A (1284).

The interconnection between the control modules allows the storage control to distribute I/O load across the storage appliance regardless of which control module receives the I/O request. Further, the interconnection of control modules enables the storage appliance to process a larger number of I/O requests. Moreover, the interconnection of control modules provides built-in redundancy in the event that a control module (or one or more components therein) fails.

In one embodiment, the in-memory data structure is mirrored across the memories in the control modules. In such cases, the processors in the control modules issue the necessary commands to update all memories within the storage appliance such that the in-memory data structure is mirrored across all the memories. In this manner, any processor may use its own memory to determine the location of a data (as defined by an n-tuple, discussed above) in the storage appliance. This functionality allows any processor to service any I/O request in regards to the location of the data within the storage module. Further, by mirroring the in-memory data structures, the storage appliance may continue to operate when one of the memories fails.

According to some embodiments, some of the components described above, such as control module(s) and/or storage module(s) may be integrated within a communication fabric, such as a PCIe fabric.

Figure 7:
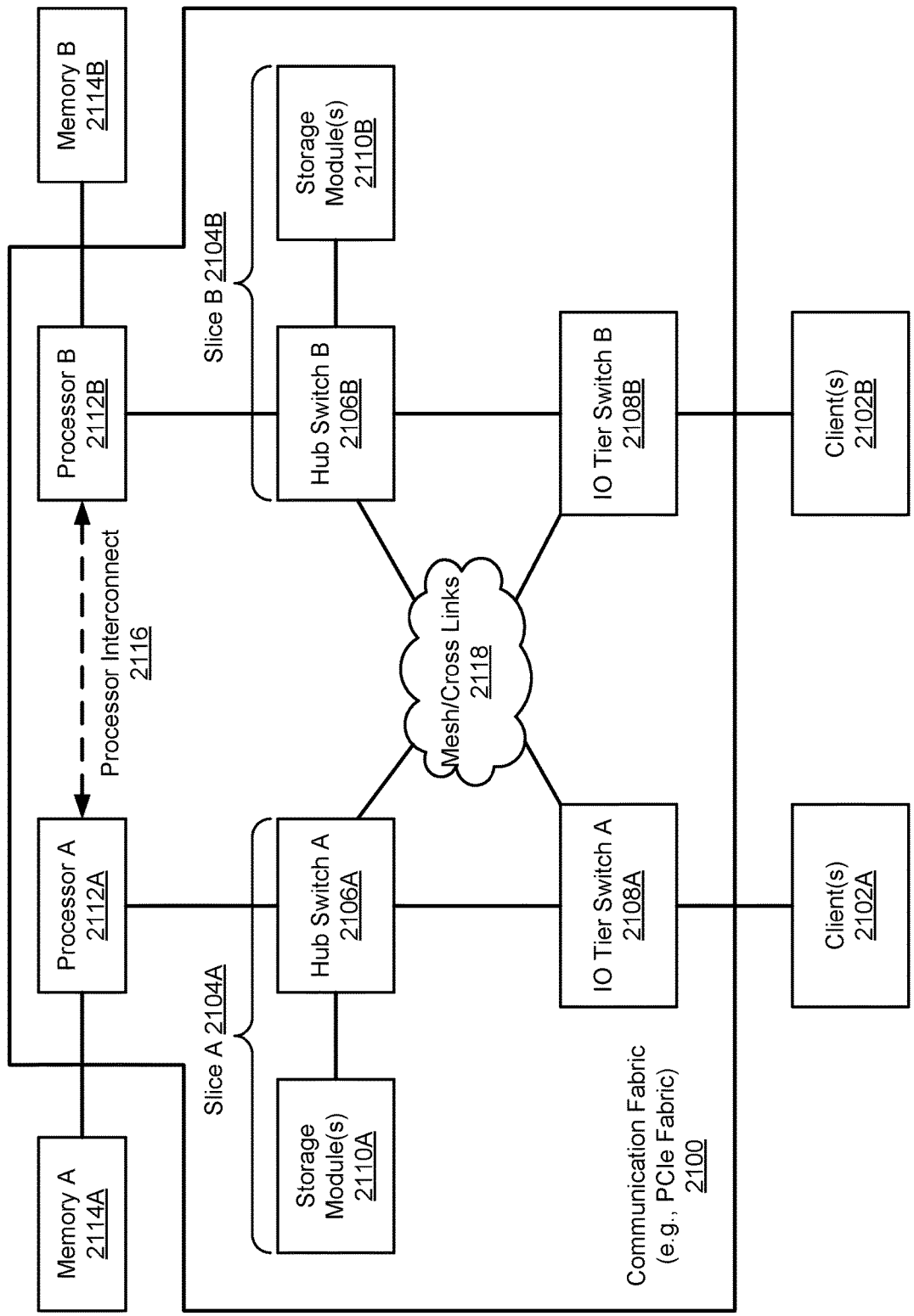
FIG. 7 is a block diagram illustrating an example of a communication fabric according to one embodiment of the invention.

FIG. 7 is a block diagram illustrating a system having a communication fabric according to one embodiment of the invention. In this example, a PCIe fabric is utilized as an example of a communication fabric for the purpose of illustration. However, it will be appreciated that other types of communication fabrics can also be applied. In one embodiment, PCIe Fabric (2100) is made up of two or more slices (2104A, 2104B), where each of the slices is coupled to a processor (2112A, 2112B) and one or more clients (2102A-2102B). Clients 2102A-2102B may represent any of the clients described above.

In one embodiment, each client (2102A-2102B) is a physical device that includes a processor (or another type of processing component), memory, and a physical interface(s) to enable it to connect to the PCIe fabric (2100). Further, each client includes functionality to implement the PCIe standard (or portions thereof) that are required to implement one or more embodiments of the invention. The clients 2102A-2102B also include functionality to send and/or receive transaction layer packets (TLP). A TLP corresponds to a type of packet that is defined in accordance with the PCIe standard. In one embodiment of the invention, the TLPs enable clients to read data from the PCIe fabric and write data to the PCIe fabric. Said another way, the TLPs enable clients to transfer data to and from locations in the PCIe fabric. In one embodiment of the invention, one or more of the clients operates as a PCIe endpoint, i.e., a device that originates a transaction and/or a device that is the target of the transaction. Each of the clients may be connected to PCIe fabric via a link, i.e., physical connection between the client and the PCIe fabric.

Each slice (2104A, 2104B) includes an Input/Output (IO) tier switch (ITS) (2108A, 2108B), a hub tier switch (HTS) (2106A, 2106B), and one or more persistent storage modules (PSMs) 2110A-2110B. With respect to the ITS, each ITS is a physical PCIe switch that is connected to one or more clients (2102A-2102B). Each ITS is also coupled to a HTS in the same slice in which the ITS is located. In addition, each ITS may be coupled to one or more HTSes in different slices than the one in which the ITS is located. In one embodiment of the invention, each ITS is connected to every HTS in the PCI fabric resulting in a fully connected mesh between the tiers in the PCIe fabric. Embodiments of the invention may be implemented without a fully connected mesh between the tiers without departing from the invention.

In one embodiment of the invention, each ITS is configured to: (i) receive TLPs from the clients with which it is connected and route the TLPs to the appropriate egress port (either the upstream port or one of the downstream ports) on the ITS using address routing, such as memory address routing, and (ii) receive TLPs from one or more HTSes to which the ITS is connected and route the TLPs to the appropriate egress port (typically a downstream port) on the ITS using address routing.

Each HTS is a physical PCIe switch that is coupled to one or more ITSes (2108A-2108B) and to one or more persistent storage modules (PSMs (2110A-2110B). Each HTS is coupled to an ITS in the same slice in which the HTS is located. In addition, each HTS may be connected to zero or more ITSes in different slices than the one in which the HTS is located. In one embodiment of the invention, each HTS is connected to every other ITS in the PCIe fabric resulting in a fully connected mesh between the tiers in the PCIe fabric. Each HTS may also be connected to a processor via its root port (not shown). Embodiments of the invention may be implemented without a fully-connected mesh between the tiers without departing from the invention.

In one embodiment, each HTS is configured to: (i) receive TLPs from the persistent storage modules (PSM) with which it is connected and route the TLPs to the appropriate egress port (typically a downstream port) on the HTS using address routing and (ii) receive TLPs from one or more ITSes to which the HTS is connected and route the TLPs to the appropriate egress port (either the upstream port and/or one or more of the downstream ports) on the HTS using address routing.

In one embodiment, each of the storage modules (2100A-2110B) includes persistent storage (not shown) and, optionally, volatile memory (not shown) (e.g., Dynamic Random-Access Memory (DRAM), Synchronous DRAM, SDR SDRAM, and DDR SDRAM). The persistent storage may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, any other memory defined as non-volatile Storage Class Memory (SCM), magnetic disks, and optical disks. Those skilled in the art will appreciate that embodiments of the invention are not limited to storage class memory. In one embodiment of the invention, each of the PSMs is part of only one slice.

Each of processors 2112A-2112B may be a group of electronic circuits with a single core that is configured to execute instructions or multiple cores that are configured to execute instructions. The processor may be implemented using a Complex Instruction Set (CISC) Architecture or a Reduced Instruction Set (RISC) Architecture. In one or more embodiments of the invention, the processor includes a root complex (as defined by the PCIe standard) (not shown). The root complex connects the processor to at least one slice and to memory (114A, 114B) (e.g., Dynamic Random-Access Memory (DRAM), Synchronous DRAM, SDR SDRAM, and DDR SDRAM) that is accessible via the PCIe fabric but that is not part of any slice in the PCIe fabric.

In one embodiment, processors (2112A, 2112B) within the PCIe fabric 2100 are able to communicate using, for example, a processor interconnect (2116) such as Intel QuickPath Interconnect, Intel Front Side Bus, or AMD HyperTransport. Those skilled in the art will appreciate that other point-to-point communication mechanisms may be used to permit direct communication between the processors (2112A, 2112B) without departing from embodiments of the invention. While clients are coupled to the ITSes and PSMs coupled to the HTSes, clients may also be coupled to the HTSes and PSMes are connected to the ITSes.

In another embodiment, the PCIe fabric may be implemented such that it does not include any PSMs 2110A-2110B; rather, both the ITSes and the HTSes are connected to separate sets of clients, wherein the PCIe fabric facilitates communication between the clients. Further, while the PCIe fabric shown only includes two slices, two processors, and four PSMs, PCIe fabric 2100 may be implemented with a fewer or greater number of each of the aforementioned components without departing from the invention. In addition, while the PCIe fabric 2100 is connected to four clients and two memories, embodiments of the invention may be implemented to enable the PCIe fabric to connect with a fewer or greater number of clients and/or memories.

Further, while embodiments of the invention have been described with respect to a PCIe fabric that includes storage (e.g., PSM 2110A-2110B), embodiments of the invention may be implemented to enable any two devices to communicate using the PCIe fabric. For example, in one embodiment of the invention, the clients may be blade servers, where the blade servers do not include any physical NIC cards and PSMs may be replaced with network endpoint devices.

In this example, network endpoint devices are devices that are configured to interface with both a network (i.e., a wired network, a wireless network or a combination thereof) using a networking protocol and with the PCIe fabric via PCIe. An example of network endpoint device is a PICe NIC card. The network endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory).

In another example, in one or more embodiments of the invention, the PSMs 2110A-2110B may be replaced with storage endpoint devices (i.e., devices that include functionality to store data and service read and write requests from clients). The storage endpoint devices may each include a combination of persistent storage (as described above with respect to the PSMs), and storage endpoint device memory (e.g., Dynamic Random-Access Memory (DRAM), Synchronous DRAM, SDR SDRAM, DDR SDRAM, or any other type of volatile memory). An example of the storage endpoint device is a storage appliance. The invention is not limited to this example.

Further, embodiments of the invention may be extended to cover two or more devices communicating via a PCIe fabric. In the general case, the PSM 2110A-2110B may be generalized to a target device, where the target device may include the PSM, a network endpoint device, a storage endpoint device, or any other device capable of communicating using PCIe. While the PCIe Fabric 2100 has been shown as including the PSMs (or more generally target devices), the PCIe Fabric 2100 may be implemented such that it does not include the target devices; rather, the PCIe Fabric 2100 only include the necessary physical components to connect to the target devices.

Figure 8:
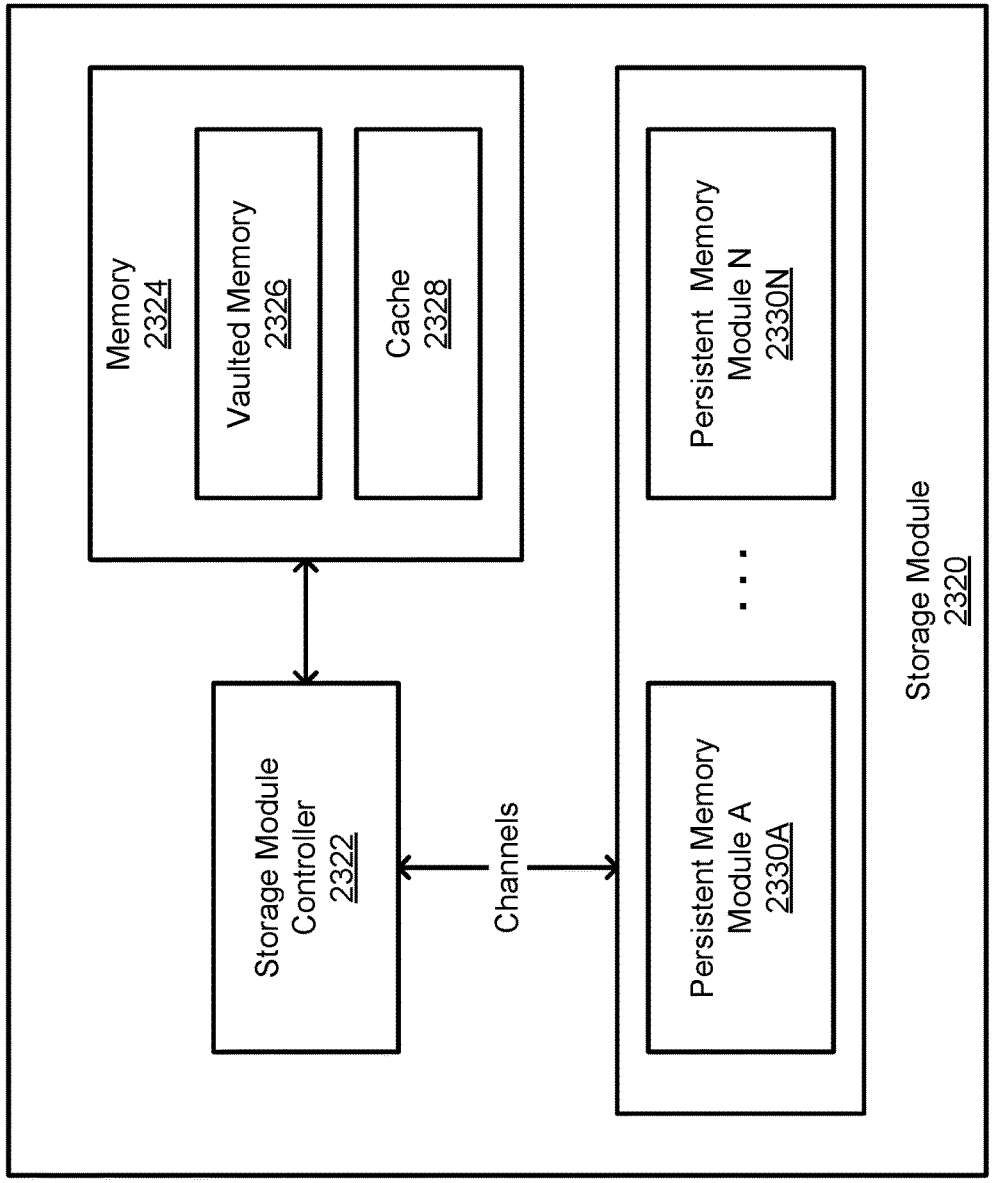
FIG. 8 is a block diagram illustrating an example of a storage module according to one embodiment of the invention.

FIG. 8 is a block diagram illustrating an example of a storage module according to one embodiment of the invention. The storage module 2320 includes a storage module controller (2322), memory (2324), and one or more persistent memory modules (2330A-2330N). Persistent memory modules 2330A-2330N may be solid state memory devices such as flash memory devices. In one embodiment, the storage module controller (2322) is configured to receive requests to read from and/or write data to one or more control modules. Further, the storage module controller (2322) is configured to service the read and write requests using the memory (2324) and/or the persistent memory modules (2330A-2330N). The storage module controller (2322) may include a DMA engine, where the DMA engine is configured to read data from the memory (2324) or from one of the persistent memory modules (2330A-2330N) and write a copy of the data to a physical address in a client memory. Further, the DMA engine may be configured to write data from the memory (2324) to one or more of the persistent memory modules. In one embodiment of the invention, the DMA engine is configured to be programmed by the processor.

The memory (2324) may be any volatile memory including, but not limited to, Dynamic Random-Access Memory (DRAM), Synchronous DRAM, SDR SDRAM, and DDR SDRAM. The memory (2324) may be logically or physically partitioned into vaulted memory (2326) and cache (2328). The storage module controller (2322) is configured to write out the entire contents of the vaulted memory (2326) to one or more of the persistent memory modules (2330A-2330N) in the event of notification of a power failure (or another event in which the storage module may lose power) in the storage module. In one embodiment of the invention, the storage module controller (2322) is configured to write the entire contents of the vaulted memory (2326) to one or more of the persistent memory modules (2330A-2330N)

between the time of the notification of the power failure and the actual loss of power to the storage module. In contrast, the content of the cache (2328) is lost in the event of a power failure (or another event in which the storage module may lose power).

The persistent memory modules may be any data storage device that uses solid-state memory to store persistent data. In one embodiment of the invention, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to storage class memory.

In one embodiment, the following storage locations are part of a unified address space: (i) the portion of the client memory accessible via the client switch, (ii) the memory in the control module, (iii) the memory in the storage modules, and (iv) the solid state memory modules. Accordingly, from the perspective of the processor in the storage appliance, the aforementioned storage locations (while physically separate) appear as a single pool of physical addresses. Said another way, the processor may issue read and/or write requests for data stored at any of the physical addresses in the unified address space. The aforementioned storage locations may be referred to as storage fabric that is accessible using the unified address space. A unified address space is created, in part, by the non-transparent bridge in the client switch which allows the processor in the control module to "see" a portion of the client memory. Accordingly, the processor in the control module may perform read and/or write requests in the portion of the client memory that it can "see."

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A storage system, comprising:
a communication fabric;
a storage system coupled to the communication fabric, the storage system having one or more storage devices for storing data;
a client device coupled to the communication fabric, the client device having an object descriptor (OD) generator to generate a plurality of object descriptors (ODs) for a plurality of data access sessions, each OD corresponding to a different data access session, to access data stored in the one or more storage devices of the storage system;
a first processor coupled to the client device and the storage system via the communication fabric to manage accesses of the storage system; and
a second processor coupled to the communication fabric, wherein the second processor is further coupled to the first processor via an inter-processor link,
wherein the first processor is adapted to:
receive a request from the client device to access a data object stored in the storage system, the request including an OD uniquely identifying the data object, wherein the OD uniquely identifying the data object is created by the OD generator of the client device,
in response to the request, examine a first object descriptor table (ODT) associated with the first processor to determine whether the OD is valid, wherein the second processor maintains a second ODT to enable the second processor to provide access to the storage system
in response to determining that the OD is valid, allow the client device to access the data object, wherein in response to the request being a first request to initiate a first data access session for accessing a first data object, the first processor is further adapted to
examine the first ODT to determine whether the first ODT includes an ODT entry that matches a first OD extracted from the first request, and in response to determining that no matching ODT entry is found,
> create a first ODT entry in the first ODT to store the first OD and an attribute of the first data object to be accessed, and
> transmit a first control signal to the second processor via the inter-processor link to allow the second processor to synchronize the second ODT with respect to the first ODT entry.

2. The storage system of claim 1, wherein the first processor is further adapted to
receive a response from the second processor indicating that the second ODT has been synchronized with the first ODT, and
return a status of the request to the client device indicating whether the request has been serviced successfully.

3. The storage system of claim 1, wherein the first OD was created by the client device, and
in response to determining that no matching ODT entry is found,
> the first processor is further adapted to return a first status to the client device, in response to receiving a first response to the first control signal from the second processor via the inter-processor link.

4. The storage system of claim 1, wherein in response to determining that a matching ODT entry is found, the first processor denies the first request without synchronizing with the second processor.

5. The storage system of claim 1, wherein in response to the request being a second request
to terminate a second data access session of accessing a second data object,
the first processor is adapted to
examine the first ODT to determine whether the first ODT includes an ODT entry that matches a second OD extracted from the second request, wherein the second OD was created by the client device, and
in response to determining that a second ODT entry is found matching the second OD, remove the second ODT entry from the first ODT,
> transmit a second control signal to the second processor via the inter-processor link to allow the second processor to synchronize the second ODT with respect to the removed second ODT entry, and
> return a second status to the client device, in response to receiving a second response to the second control signal from the second processor via the inter-processor link.

6. The storage system of claim 5, wherein in response to determining that no matching ODT entry matching the second OD is found, the first processor denies the second request without synchronizing with the second processor.

7. The storage system of claim 1, wherein the communication fabric comprises a peripheral component interface express (PCIe) fabric.

8. A computer-implemented method for accessing data in a storage system, the method comprising:
receiving, by a first processor, a request from a client device to access a data object stored in a storage system having one or more storage devices, the request including an object descriptor (OD) uniquely identifying the data object, wherein the OD uniquely identifying the data object is created by an OD generator of the client device, each OD corresponding to a different data access session, wherein the first processor is coupled to the client device and the storage system via a communication fabric to manage accesses to data stored in the storage system and the first processor is coupled to a second processor via an inter-processor link, the second processor being coupled to the client device and the storage system via the communication fabric;
in response to the request, examining by the first processor a first object descriptor table (ODT) associated with the first processor to determine whether the OD is valid, wherein the second processor maintains a second ODT to enable the second processor to provide access to the storage system; and
in response to determining that the OD is valid, allowing the client device to access the data object, wherein in response to the request being a first request to initiate a first data access session for accessing a first data object, the method further comprises
examining the first ODT to determine whether the first ODT includes an ODT entry that matches a first OD extracted from the first request; and
in response to determining that no matching ODT entry is found,
> creating a first ODT entry in the first ODT to store the first OD and an attribute of the first data object to be accessed,
> transmitting a first control signal to the second processor via the inter-processor link to allow the second processor to synchronize the second ODT with respect to the first ODT entry.

9. The method of claim 8, further comprising:
receiving by the first processor a response from the second processor indicating that the second ODT has been synchronized with the first ODT, and
returning by the first processor a status of the request to the client device indicating whether the request has been serviced successfully.

10. The method of claim 8, wherein the first OD was created by the client device; and the method further comprises,
in response to determining that no matching ODT entry is found,
returning a first status to the client device, in response to receiving a first response to the first control signal from the second processor via the inter-processor link.

11. The method of claim 8, further comprising, in response to determining that a matching ODT entry is found, denying the first request without synchronizing with the second processor.

12. The method of claim 8, wherein in response to the request being a second request
to terminate a second data access session of accessing a second data object, the method further comprises;
examining the first ODT to determine whether the first ODT includes an ODT entry that matches a second OD extracted from the second request, wherein the second OD was created by the client device; and
in response to determining that a second ODT entry is found matching the second OD,
> removing the second ODT entry from the first ODT,
> transmitting a second control signal to the second processor via the inter-processor link to allow the second processor to synchronize the second ODT with respect to the removed second ODT entry, and
> returning a second status to the client device, in response to receiving a second response to the second control signal from the second processor via the inter-processor link.

13. The method of claim 12, further comprising, in response to determining that no matching ODT entry matching the second OD is found, denying the second request without synchronizing with the second processor.

14. The method of claim 8, wherein the communication fabric comprises a peripheral component interface express (PCIe) fabric.

15. A non-transitory machine-readable medium having instructions stored therein, which when executed by a machine, cause the machine to perform operations of accessing data in a storage system, the operations comprising:
receiving, by a first processor, a request from a client device to access a data object stored in a storage system having one or more storage devices, the request including an object descriptor (OD) uniquely identifying the data object, wherein the OD uniquely identifying the data object is created by an OD generator of the client device, each OD corresponding to a different data access session, wherein the first processor is coupled to the client device and the storage system via a communication fabric to manage accesses to data stored in the storage system, wherein the first processor is coupled to a second processor via an inter-processor link, and wherein the second processor is coupled to the client device and the storage system via the communication fabric;
in response to the request, examining by the first processor a first object descriptor table (ODT) associated with the first processor to determine whether the OD is valid, wherein the second processor maintains a second ODT to enable the second processor to provide access to the storage system;
in response to determining that the OD is valid, allowing the client device to access the data object, wherein in response to the request being a first request to initiate a first data access session for accessing a first data object, the operations further comprise:
examining the first ODT to determine whether the first ODT includes an ODT entry that matches a first OD extracted from the first request, wherein the first OD was created by the client device; and
in response to determining that no matching ODT entry is found,
creating a first ODT entry in the first ODT to store the first OD and an attribute of the first data object to be accessed,
transmitting a first control signal to the second processor via the inter-processor link to allow the second processor to synchronize the second ODT with respect to the first ODT entry.

16. The non-transitory machine-readable medium of claim 15 wherein the operations further comprise:
receiving by the first processor a response from the second processor indicating that, the second ODT has been synchronized with the first ODT, and
returning by the first processor a status of the request to the client device indicating whether the request has been serviced successfully.

17. The non-transitory machine-readable medium of claim 15, wherein the first OD was created by the client device; and wherein the medium has further instructions comprising,
in response to determining that no matching ODT entry is found,
returning a first status to the client device, in response to receiving a first response to the first control signal from the second processor via the inter-processor link.

18. The non-transitory machine-readable medium of claim 15, wherein the operations further comprise, in response to determining that a matching ODT entry is found, denying the first request without synchronizing with the second processor.

19. The non-transitory machine-readable medium of claim 15, wherein in response to the request being a second request
to terminate a second data access session of accessing a second data object, the medium has further instructions comprising
examining the first ODT to determine whether the first ODT includes an ODT entry that matches a second OD extracted from the second request, wherein the second OD was created by the client device; and
in response to determining that a second ODT entry is found matching the second OD, removing the second ODT entry from the first ODT,
transmitting a second control signal to the second processor via the inter-processor link to allow the second processor to synchronize the second ODT with respect to the removed second ODT entry, and
returning a second status to the client device, in response to receiving a second response to the second control signal from the second processor via the inter-processor link.

20. The non-transitory machine-readable medium of claim 19, wherein the operations further comprise, in response to determining that no matching ODT entry matching the second OD is found, denying the second request without synchronizing with the second processor.

21. The non-transitory machine-readable medium of claim 15, wherein the communication fabric comprises a peripheral component interface express (PCIe) fabric.

* * * * *